(12) United States Patent
Diallo et al.

(10) Patent No.: US 8,352,192 B2
(45) Date of Patent: Jan. 8, 2013

(54) METHOD FOR PERFORMING CONSTRAINED POLARIZATION FILTERING

(75) Inventors: Mamadou S. Diallo, Houston, TX (US); Marvin L. Johnson, Chromo, CO (US); Warren S. Ross, Houston, TX (US); Christine E. Krohn, Houston, TX (US)

(73) Assignee: ExxonMobil Upstream Research Comapny, Houston, TX (US)

( * ) Notice: Subject to any disclaimer, the term of this patent is extended or adjusted under 35 U.S.C. 154(b) by 242 days.

(21) Appl. No.: 12/865,533

(22) PCT Filed: Feb. 18, 2009

(86) PCT No.: PCT/US2009/034390
§ 371 (c)(1),
(2), (4) Date: Jul. 30, 2010

(87) PCT Pub. No.: WO2009/120430
PCT Pub. Date: Oct. 1, 2009

(65) Prior Publication Data
US 2011/0004409 A1   Jan. 6, 2011

Related U.S. Application Data

(60) Provisional application No. 61/072,319, filed on Mar. 28, 2008.

(51) Int. Cl.
*G01V 1/00* (2006.01)
*G01V 1/28* (2006.01)
*G06F 19/00* (2006.01)

(52) U.S. Cl. .................. 702/17; 367/31; 702/18

(58) Field of Classification Search .............. 702/16–18, 702/66, 75, 76, 194; 700/94; 367/31, 43, 367/45, 47, 75; 181/112
See application file for complete search history.

(56) References Cited

U.S. PATENT DOCUMENTS

| | | |
|---|---|---|
| 3,858,168 A | 12/1974 | Barr, Jr. et al. |
| 4,648,039 A | 3/1987 | Devaney et al. |
| 4,757,480 A | 7/1988 | Gutowski |

(Continued)

FOREIGN PATENT DOCUMENTS
WO   WO 2007/006145   1/2007

OTHER PUBLICATIONS

Diallo, M. et al. (2005), "Instantaneous Polarization Attributes in the Time-Frequency Domain and Wavefield-Separation", *Geophys. Prosp.* 53(5), pp. 723-731.

(Continued)

*Primary Examiner* — John H Le
(74) *Attorney, Agent, or Firm* — ExxonMobil Upstream Research Company Law Dept.

(57) ABSTRACT

An exemplary method for filtering multi-component seismic data is provided. One or more characteristics of the seismic data corresponding to a relative manifestation of surface wave noise on the different components, such as polarization attributes, are identified. A time-frequency boundary in the seismic data is also identified in the time-frequency transform domain, the time-frequency boundary delineating portions of the seismic data estimated to contain surface wave noise (302). Finally, filtered seismic data are created (306) by removing portions of the seismic data that correspond to the identified characteristics of surface waves and that are within the time-frequency boundary (303).

25 Claims, 18 Drawing Sheets

U.S. PATENT DOCUMENTS

| | | | |
|---|---|---|---|
| 4,890,264 | A | 12/1989 | Crews et al. |
| 5,060,203 | A | 10/1991 | Winterstein |
| 5,067,112 | A | 11/1991 | Meek et al. |
| 5,671,136 | A * | 9/1997 | Willhoit, Jr. .................... 702/18 |
| 5,781,502 | A | 7/1998 | Becquey |
| 5,971,095 | A | 10/1999 | Ozbek |
| 6,961,283 | B2 | 11/2005 | Kappius et al. |
| 2007/0043458 | A1 | 2/2007 | Pinnegar |

OTHER PUBLICATIONS

Diallo, M. et al. (2006), "Characterization of Polarization Attributes of Seismic Waves Using Continuous Wavelet Transform", *Geophysics* 71(3), pp. V67-V77.

Diallo, M. et al., "Characterization of Dispersive Rayleigh wave using Wavelet Transforms", Abstract, 2006.

Diallo, M. et al. (2003), "Characterization of Dispersive Rayleigh wave using Wavelet Transform", *Eos. Trans. AGU* 84(46), Fall Meet. Supp., Abstract S22B-0442, 5 pgs.

Diallo, M. et al., "Instanteous Polarization Attributes in the Time-Frequency Domain: Application to Wavefield Separation", Abstract, 2005.

Pinnegar, C.R. (2006), "Polarization analysis and polarization filtering of three-component signals with the time-frequency S transform", *Geophys. J. Int.* 165, pp. 596-606.

Pinnegar, R. (2006), "Time-Frequency Polarization Analysis and Filtering", *CSEG Recorder*, pp. 34-39.

*International Search Report and Written Opinion*, dated Apr. 28, 2009, PCT/US2009/034390.

\* cited by examiner

600

METHOD FOR PERFORMING CONSTRAINED POLARIZATION FILTERING

CROSS-REFERENCE TO RELATED APPLICATION

This application claims the benefit of U.S. Provisional Patent Application No. 61/072,319, filed Mar. 28, 2008.

FIELD OF THE INVENTION

The present invention relates to improving the effectiveness of seismic prospecting. In particular, an exemplary embodiment of the present invention relates to a method for performing constrained polarization filtering of seismic data.

BACKGROUND OF THE INVENTION

[An important goal of seismic prospecting is to image subsurface reflectors. Seismic processing is typically performed on raw seismic data obtained by a seismic survey. During a seismic survey, seismic energy is generated at or near ground level for land surveys or in the water for marine surveys by seismic sources, for example, vibrator trucks or air guns. The seismic energy results in ground motion, which is detected by seismic receivers, for example, geophones or accelerometers. Such receivers can include sensors that detect single or multiple components of the vector ground motion, for example motion along the vertical and one or more horizontal directions. In the later case, the survey is called a multi-component survey. The intent of both single and multi-component surveys is to receive reflected waves from underground structures to allow an accurate mapping of the underground environment, including identification of geological formations that may contain hydrocarbons. Seismic energy that is transmitted into the earth as propagating waves, reflected by an underground structure and returned to the surface to be measured by seismic receivers provides meaningful information about subsurface structures. Such energy propagated to and reflected from subsurface structures may be referred to as "body waves" or "reflections" herein. Body waves may be either compression (P-waves) or shear waves (S-waves).

Unfortunately, a large amount of the seismic energy generated by seismic sources is not in the form of body waves. Instead, considerable energy travels horizontally through the shallow region near the surface of the earth or along the ocean bottom and are recorded by the receivers that are desirably intended to receive reflected waves indicative of a property of an underground structure. The strong horizontally traveling surface waves, which may also be referred to as ground roll, can undesirably mask the weaker reflected body waves. Accordingly, it is desirable to filter the seismic data to reduce the surface wave amplitudes in order to generate an accurate image of subsurface formations. These filters treat the body waves as signals to be retained and the surface waves as noise to be removed.

Ground roll or surface wave filtering methods exploit differences between the properties of surface waves (ground roll noise) and body waves (reflection signal). One example of a distinguishing characteristic is that surface waves typically have lower frequency content than body waves. This distinguishing characteristic would suggest using a low cut filter to eliminate the effect of ground roll. Unfortunately, there is not a single characteristic that clearly distinguishes surface waves from body waves. As a result, a problem with typical ground-roll mitigation methods is that reflector amplitudes are often filtered and reduced along with the surface wave amplitudes. For this reason, the use of a low cut filter to arbitrarily reduce seismic amplitudes below a certain specified frequency would undesirably reduce low frequency amplitudes of incident body waves as well. This could potentially remove the ability to accurately image deep reflectors or to perform sophisticated reservoir property analyses.

As another example, ground roll typically has a much lower velocity than body waves. Therefore, ground roll typically has more moveout from trace to trace. Some methods of seismic data analysis attempt to exploit this difference by employing techniques such as velocity filtering, FK filtering, adaptive filtering, beam forming or the like. A problem with such methods is that they require a sufficiently short distance between each of the receivers so that the recorded ground roll is not aliased. If the distance is too large, then the apparent ground roll velocity is ambiguous at some frequencies and both ground roll and reflectors can be removed.

For a multi-component survey, measurements of two or more vector components of the ground motion (for example, both horizontal and vertical components) may provide additional data that can be used to distinguish between surface waves and body waves to facilitate removal of surface waves and retention of body waves. One known approach is polarization filtering, which exploits the fact that body waves have polarization characteristics that can be used to distinguish them from surface waves. Polarization characteristics relate the amplitude and phase differences on different components. These characteristics are indicative of different wave types. In particular, it is known that the typical surface wave (sometimes referred to as a Rayleigh wave) has a distinctive amplitude and phase relationship between the vertical and horizontal components. Specifically, Rayleigh waves are elliptically polarized. The process of polarization filtering includes analyzing the seismic data, and finding a threshold that distinguishes elliptically polarized Rayleigh waves from linearly polarized reflected body waves and then reducing the amplitude of those events that are above the polarization threshold.

U.S. Pat. No. 3,858,168 to Barr et al., the contents of which are hereby incorporated by reference as if fully set forth herein, discloses one example of a known method that uses polarization filtering to attempt separation of signal (body wave) and surface-wave noise. However, the success of such polarization filtering methods is limited because the surface wave energy does not consist of only Rayleigh waves but rather a mix of Rayleigh waves and other forms of surface waves that may not have simple distinctive polarization characteristics compared to signal (body waves). Examples of these other types of surface waves include Love waves, other types of guided waves, and scattered surface-waves and the like. In addition, interference between, for example, a P-wave and an S-wave can appear elliptical in nature, giving the erroneous impression that good signal data corresponds to surface wave noise. Furthermore, because surface waves tend to travel through a highly inhomogeneous, poorly consolidated soil layer, the polarization properties can change and become distorted. Finally, the very interference of several different types of surface waves, and surface waves interfering with reflected and converted body-waves at the same time and offset in a seismic record, makes the computation of polarization ambiguous.

The use of many known polarization filtering techniques involves the selection of an optimal time window to analyze the polarization and to apply the filter. Since ground-roll has a low velocity, reflection energy arrives much earlier than the first ground-roll energy, and this region earlier than the first ground-roll energy can be excluded so that these portions are not harmed by the filter or distort the analysis. But it is difficult to optimize a small window to further isolate the ground roll given the dispersive nature of surface waves. Low-frequency components of the ground roll penetrate more deeply below the surface where the surface-wave velocity is faster, and thus they arrive before high-frequency components of the ground roll, which sample the shallow, slower part of the earth. This dispersion spreads out the ground roll and a large time window is needed to capture it. Such known methods may be used to separate seismic data into data about linearly polarized signals (P-waves and S-waves) and elliptically polarized signals (Rayleigh waves).

Because surface waves tend to be relatively low frequency compared to body waves, raw seismic data may be bandpass filtered or frequency windowed to isolate or predominantly isolate those waves prior to the application of polarization. One example of this technique is set forth in U.S. Pat. No. 4,757,480 to Gutowski, the contents of which are hereby incorporated by reference as if fully set forth herein. Gutowski discloses the use of a multiple frequency filter or a comb filter and performing polarization filtering in each frequency region. This technique removes some of the high frequency interference. However, there is still some low-frequency reflector energy within the window and interference between reflections and surface-wave noise can still be a problem. Also, some of the surface waves are more complex and do not have simple elliptical behavior.

U.S. Pat. No. 6,961,283 to Kappius, the contents of which are hereby incorporated by reference as if fully set forth herein, teaches the use of adaptive filtering to remove the surface wave component which exhibits an elliptical retrograde particle motion (ground roll). However this method does not remove other types of surface-wave noise such as guided waves that do not exhibit elliptical particle motion. The method shown in Kappius also uses both time windowing and band-pass filtering to isolate the seismic data containing ground roll prior to polarization filtering. Since the method relies on the phase difference being close to 90 degrees for the detection of ground roll, occurrence of random noise and interference between different wave types would greatly affect its efficiency.

There are limits to the ability to isolate the surface waves using separate time and frequency windows. It is well known that a narrow time window corresponds to a wide frequency window, i.e. a spike is spread over all frequencies. Similarly, a narrow frequency window results in data spread over time. A different approach is to transform the seismic data into a joint time-frequency domain. Standard methods to do this transform include the Wavelet Transform and the S-transform. These methods are reversible. It is possible to transform time domain data to the wavelet domain, for example, perform an operation such as a filter, and then transform back to the time domain. The advantage to working in the time-frequency domain for polarization filtering is that the surface waves are more isolated. This can make the analysis more precise and result in a filter that affects only a small region of the data and protects more of the reflectors.

Examples of seismic analysis in the time-frequency domains are set forth in the following publications: 1) Diallo, M. S., Kulesh, M., Holschneider, M., Scherbaum, F., 2005, Instantaneous Polarization Attributes in the Time-Frequency Domain and Wavefield-Separation, *Geophys. Prosp.* 53 (5), 723-731 ("the Diallo 2005 publication"); 2) Diallo, M. S., Kulesh, M., Holschneider, M., Scherbaum, F., Adler, F., 2006, Characterization of Polarization attributes of Seismic Waves Using continuous Wavelet Transform: *Geophysics,* 71 (3), V67-V77 ("the Diallo 2006 publication"); and 3) International Patent Publication No. WO 2007/006145 by Pinnegar ("the Pinnegar publication"). The entire contents of each of these three publications is hereby incorporated by reference as if fully set forth herein. The former two publications disclose the continuous wavelet transform (CWT) and the latter, the time-frequency S-transform. These methods provide analytical expressions that relate the analyzed signal to its polarization attributes. Unlike methods that compute polarization attributes in the time domain only, these methods are invertible (i.e. given the polarization attributes, it is possible to recover the signal). Polarization filtering is therefore achieved by delimiting the time-frequency domain of the signal using the polarization attributes followed by an inverse transform to obtain the filtered signal.

It is noted that the Pinnegar publication discloses a method of polarization analysis of three-component seismograms in the time-frequency domain to identify different types of surface wave modes (Love, Rayleigh waves or the like). The Pinnegar publication does not, however, disclose the determination of attributes that allow optimal separation of surface waves and body wave reflections.

U.S. Pat. No. 5,781,502 to Becquey, the contents of which are hereby incorporated by reference as if fully set forth herein, describes a method for attenuating the component of the surface wave with retrograde particle motion (i.e. ground roll) using a continuous wavelet transform. However, the method disclosed in Becquey does not constrain the application of the method to minimize the effect on the signal. Furthermore, the method set forth in Becquey does not relate to the removal of other types of surface wave noise that do not exhibit elliptical polarization.

Despite the improvement in surface wave attenuation that can be obtained with polarization analysis in the time-frequency domain, known methods all have limitations. Because of noise interference with signal, or interference between coherent-wave types in some regions of the time-frequency domain, patterns of polarization attributes typical of surface-wave noises may appear where no actual surface-wave noise arrivals are observed. For the same reason, one may also observe polarization patterns typical of signal in regions of the time-frequency domain covered with only surface-wave noises. Therefore, surface-wave noise mitigation based on the polarization attributes alone may not yield the desired result of removing the noise while preserving the signal. To fully preserve data corresponding to reflectors requires compromising on the filtering of surface waves. An improved system and method for performing accurate filtering on seismic data to minimize the influence of undesirable surface waves or ground roll is desirable.

SUMMARY OF THE INVENTION

An exemplary embodiment of the present invention relates to a method for filtering multi-component seismic data. The exemplary method comprises identifying a plurality of characteristics of the seismic data, the plurality of characteristics corresponding to a relative manifestation of surface wave noise on the different components. The exemplary method further comprises identifying a time-frequency boundary in the seismic data, the time-frequency boundary delineating portions of the seismic data estimated to contain surface wave noise and creating filtered seismic data by removing portions of the seismic data that correspond to the plurality of characteristics of surface waves and that are within the time-frequency boundary.

A method for filtering multi-component seismic data in accordance with another exemplary embodiment of the present invention comprises estimating an earliest arrival time of surface-wave noises for a portion of the seismic recorded at a plurality of locations using multi-component sensors and identifying a plurality of polarization characteristics of the seismic data in a time-frequency domain. The exemplary method further comprises estimating a threshold for each of the plurality of polarization characteristics of the seismic data, the threshold separating the seismic data into a first data portion that is estimated to contain surface-wave noises and a second data portion that is not estimated to contain surface-wave noises. In addition, the exemplary method comprises creating filtered seismic data by removing portions of the seismic data that correspond to the first data portion and that occur after the earliest arrival time of the surface-wave noise.

A computer system that is adapted to perform filtering of multi-component seismic data in accordance with an exemplary embodiment of the present invention comprises means for identifying a plurality of characteristics of the seismic data, the plurality of characteristics corresponding to a relative manifestation of surface wave noise on the different components. The exemplary computer system also comprises means for identifying a time-frequency boundary in the seismic data, the time-frequency boundary delineating portions of the seismic data estimated to contain surface wave noise. Finally, the exemplary computer system comprises means for creating filtered seismic data by removing portions of the seismic data that correspond to the plurality of characteristics of surface waves and that are within the time-frequency boundary.

Exemplary embodiments of the present invention may perform filtering on multi-component seismic data by employing polarization attributes such as a rise angle, an inverse ellipticity ratio, a polarization direction or the like to identify portions of seismic data that are estimated to contain data corresponding to undesirable surface-wave noises. Data filtering may be constrained to particular areas of the time-frequency domain using, for example, a time-frequency boundary, the time-frequency boundary delineating portions of the multi-component seismic data estimated to contain surface-wave noises. Another example of a constraint includes the maximum apparent velocity of the surface-wave noises of the seismic data, which may be used to identify a range of times that are estimated to contain data corresponding to these noises. In addition, an exemplary embodiment of the present invention may employ a threshold that varies with time or frequency for each of the polarization characteristics of the multi-component seismic data.

An exemplary embodiment of the present invention may include performing a forward and/or inverse time-frequency transform on the seismic data. An inverse time-frequency transform may be performed on filtered data to allow the creation of a visual representation of an underground environment based on the seismic data.

In one exemplary embodiment of the present invention, successive iterations of constrained polarization filtering are performed on seismic data to remove additional data corresponding to surface-wave noises. One such exemplary embodiment comprises identifying a second plurality of characteristics of the filtered seismic data, the second plurality of characteristics corresponding to surface-wave noises in the filtered seismic data. An exemplary embodiment may additionally comprise identifying a second boundary in the filtered seismic data, the second boundary delineating portions of the filtered seismic data estimated to contain surface-wave noises, and creating second filtered seismic data by removing portions of the filtered seismic data that correspond to the second plurality of characteristics and that are within the second boundary.

DESCRIPTION OF THE DRAWINGS

The advantages of the present invention will be better understood by referring to the following detailed description and the attached drawings, in which.

DETAILED DESCRIPTION OF THE INVENTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Figure 1:
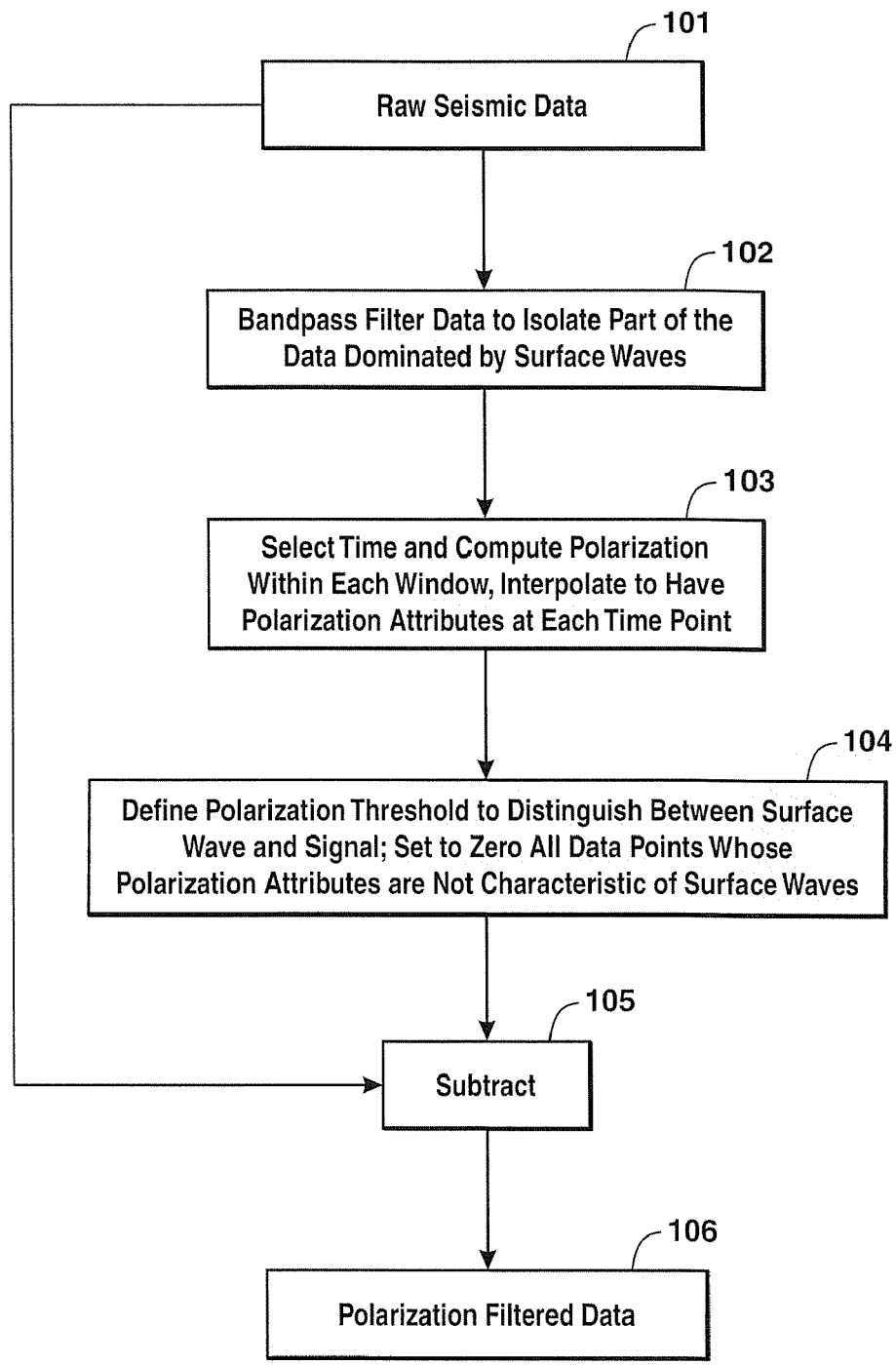
FIG. 1 is a process flow diagram that shows a known method of processing seismic data.

FIG. 1 is a process flow diagram that shows a known method of processing seismic data using polarization filtering. The method shown in FIG. 1 is generally referred to by the reference number 100. By first understanding the operation of the known method 100 of processing seismic data, the discussion of an exemplary embodiment of the present invention set forth below may be better understood.

The method 100 begins with raw seismic data, as shown at block 101. The raw seismic data 101 comprises a multi-component dataset directly obtained by recording seismic waves using multicomponent sensors placed at several locations. At block 102, the raw seismic data is filtered with a bandpass filter to retain data from a frequency range typically dominated by surface waves.

Using the output obtained from the bandpass filtering operation (block 102), time windows are selected for the computation of the polarization attributes, as shown at block 103. Additionally, polarization attributes are computed for each time window selected and polarization attributes are interpolated to cover each time point of the multi-component datasets.

At block 104, threshold values for the polarization attributes that best distinguish the surface wave noise from the reflection signal are defined. Surface wave noise is then estimated by setting to zero any time point of the record obtained from block 102 with polarization not characteristic of the surface wave (as defined by the imposed threshold values). The result is an estimate of the contribution of surface waves to the dataset.

The estimated surface-wave noise (obtained from step 104) is then subtracted from the original datasets, as shown at block 105. The result yields the filtered multi-component signal, as shown at block 106.

In the field of earthquake seismology, methods have been developed to compute instantaneous polarization attributes using complex traces. These methods are used to analyze surface waves to infer the deep earth properties. They provide for finer and more detailed analyses than can be obtained with the more traditional windowing approach.

The following is a brief describe of the polarization attributes computed from a complex trace, which serves as the basis for the development of an exemplary embodiment of the present invention. Consider $V_x$ and $V_z$ the radial and vertical components from multi-component recording. These two components are combined to construct a complex ellipse as follows:

$$C(t) = V_x(t) + iV_z(t) \quad (1)$$

where i is the square root of −1.

In general this signal is not analytic and thus it has a prograde part $C^+(t)$ and a retrograde part $C^-(t)$ such that $$C(t) = C^+(t) + C^-(t) \quad (2)$$

where $$C^\pm(t) = \frac{1}{2}(1 \pm iH)C(t)$$

and H is the Hilbert transform. Locally around t, we may write $$C^\pm(t+\tau) \approx C^\pm(t)e^{i\omega_\pm(t)\tau},$$

with $$\omega^\pm(t) = \frac{\pm \partial(\arg(C^\pm(t)))}{\partial t}$$

being the instantaneous frequencies of $C^\pm(t)$. Therefore we can write locally $$C(t+\tau) \approx C^+(t)e^{i\omega_+(t)\tau} + C^-(t)e^{-i\omega_-(t)\tau} \quad (3)$$

This equation describes a rotating ellipse.

Figure 2:
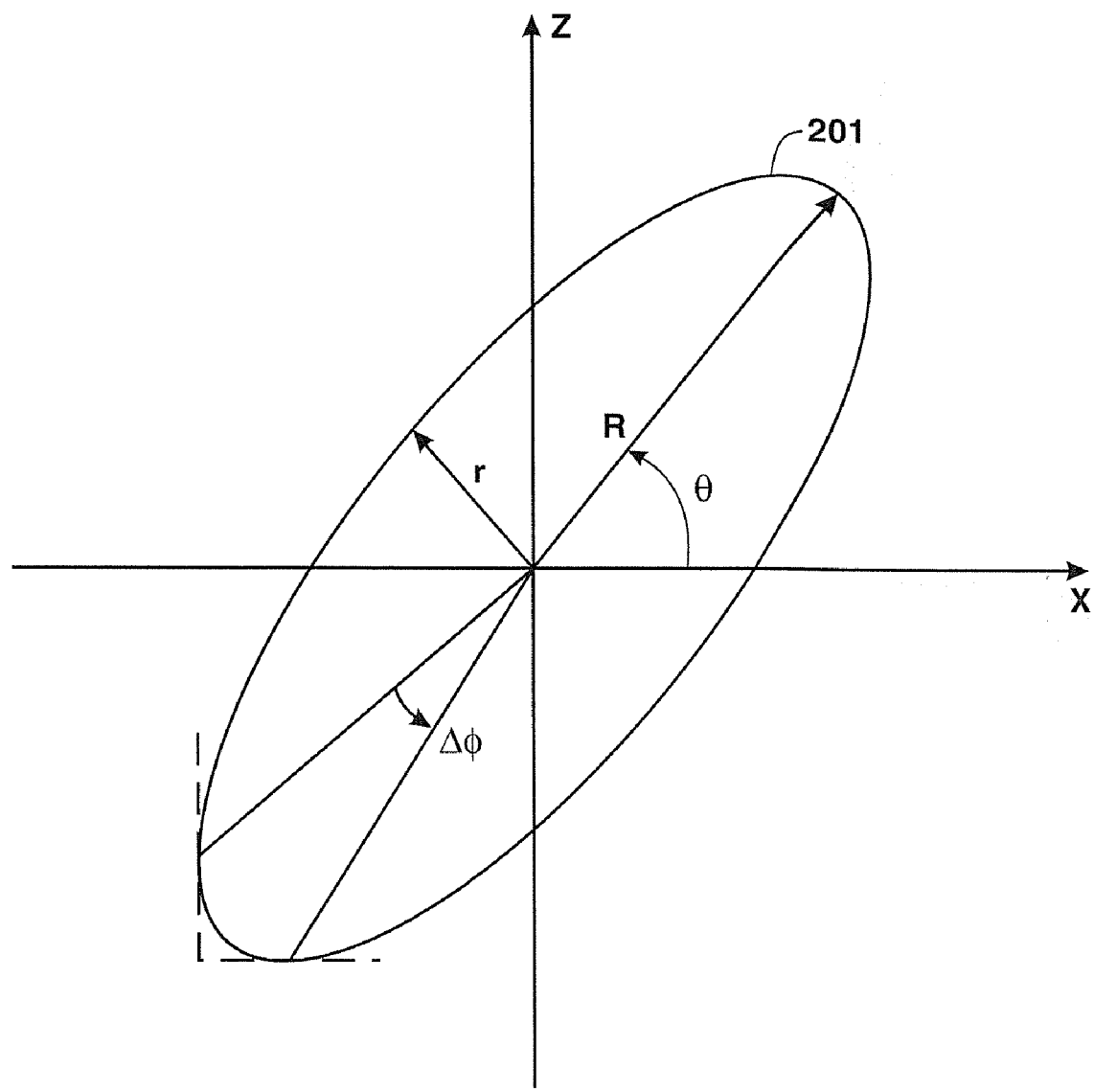
FIG. 2 is a diagram of a polarization ellipse that is useful in explaining the identification of polarization properties of seismic data signals in accordance with an exemplary embodiment of the present invention.

FIG. 2 is a diagram of a polarization ellipse that is useful in explaining the identification of polarization properties of seismic data signals in accordance with an exemplary embodiment of the present invention. The diagram is generally referred to by the reference number 200. The attributes of an ellipse 201 shown in FIG. 2 are defined as follows in Table 1 (the horizontal bars on the expression of $\Delta\phi(t)$ indicate the complex conjugate) and are illustrated in FIG. 2.

TABLE 1

Instantaneous Polarization Attributes

| Symbol | Name | Expression |
|---|---|---|
| R(t) | Instantaneous semi-major axis of ellipse | $\|C^+(t) + C^-(t)\|$ |
| r(t) | Instantaneous semi-minor axis of ellipse | $\|C^+(t)\| - \|C^-(t)\|$ |
| θ(t) | Rise angle | $\theta(t) = \frac{1}{2}\arg(C^+(t)\overline{C^+(t)})) \mod \pi$ |
| Δϕ(t) | Instantaneous phase difference between $V_x(t)$ and $V_z(t)$ | $\arg\left(\frac{\overline{(C^+(t) + C^-(t))}}{\overline{(C^+(t) - C^-(t))}}\right) + \frac{\pi}{2}$ |
| Ω(t) | Angular frequency inside the polarization ellipse | $\Omega(t) = (\omega^+(t) + \omega^-(t))/2$ |
| Γ(t) | Rotation frequency of the semi-major axis | $\Gamma(t) = (\omega^+(t) - \omega^-(t))/2$ |
| ρ(t) | Inverse ellipticity ratio | $\rho(t) = \frac{r(t)}{R(t)}$ |

Those of ordinary skill in the art will appreciate that ρ(t) varies between 0 and 1. Note that for a rotating ellipse the rise angle θ(t) and instantaneous phase difference Δϕ(t) are not intrinsically defined. In order for θ(t) and Δϕ(t) to be meaningful they must be evaluated for Γ(t)=0. For seismic signals, these parameters are meaningful since the relation Γ(t)<<Ω(t) is always valid.

With some algebraic manipulation, one can express $C^+(t)$ and $C^-(t)$ in terms of R(t), r(t) (hence ρ(t)) and θ(t) as follows:

$$C^\pm(t) = |R(t) \pm r(t)|e^{i[\theta(t)+\theta_0(t)]} \quad (4)$$

where $\theta_0(t)=\arg(C^+(t)C^-(t))/2$ and the algebraic expression of r(t) is considered $(r(t)=|C^+(t)|-|C^-(t)|)$. Equation 4 yields the invertible relationship between the geometrical attributes (r(t), R(t) and $\theta$(t)) of the instantaneous ellipse and $C^\pm$(t) from which $V_x$ and $V_z$ can be recovered.

In an exemplary embodiment of the present invention, complex trace analysis is enhanced by employing a time-frequency transform such as a transform into the wavelet domain. Such a transform allows the analyses to be localized both in time and in frequency.

To express the attributes defined in Table 1 and equation 4 in the time-frequency domain, and hence be able to analyze the time-frequency dependence of polarization attributes, we use the continuous wavelet transform (CWT) of C(t) with respect to a wavelet g(t) as $$W_g C(b,a) = \int_{-\infty}^{+\infty} \frac{1}{a} g^*\left(\frac{t-b}{a}\right) C(t) dt, \quad (5)$$

where g((t−b)/a) is a family of wavelet functions generated from a mother wavelet g(t) (where * indicates the complex conjugate) through dilation a∈R and translation b∈R . If one uses a wavelet with a unit central frequency, the scale a can be directly related to the frequency f as f=1/a . Given the wavelet coefficients $W_g$(b,a), it is possible to recover C(t), and hence $V_x$ and $V_z$.

Using a wavelet with unit central frequency, equations 1 through 4 can be expressed in terms of the time parameter b and the frequency f. Equation 4 is then written as $$W_g^\pm(b,f)=|R(b,f)\pm r(b,f)|e^{i[\theta(b,f)+\theta_0(b,f)]} \quad (6)$$

where $\theta_0(b,f)=\arg(W_g^+(b,f)W_g^-(b,f))/2$ and the algebraic expression of r(b,f) is considered $(r(b,f)=|W_g^+(b,f)|-|W_g^-(b,f)|)$. In the Diallo 2005 publication, it is disclosed to use $\theta$(b,f) and $\rho$(b,f) to separate different wave types. For surface wave noise mitigation, the Diallo 2006 publication discloses to set to zero the wavelet coefficients $W_g$ (b,a) where the rise angle r(b,f) and the inverse ellipticity $\rho$(b,f) have values characteristic of surface waves. The Diallo 2005 and 2006 publications, however, do not disclose limiting filtering to a time-frequency boundary to better protect signal while removing more noise.

Figure 3:
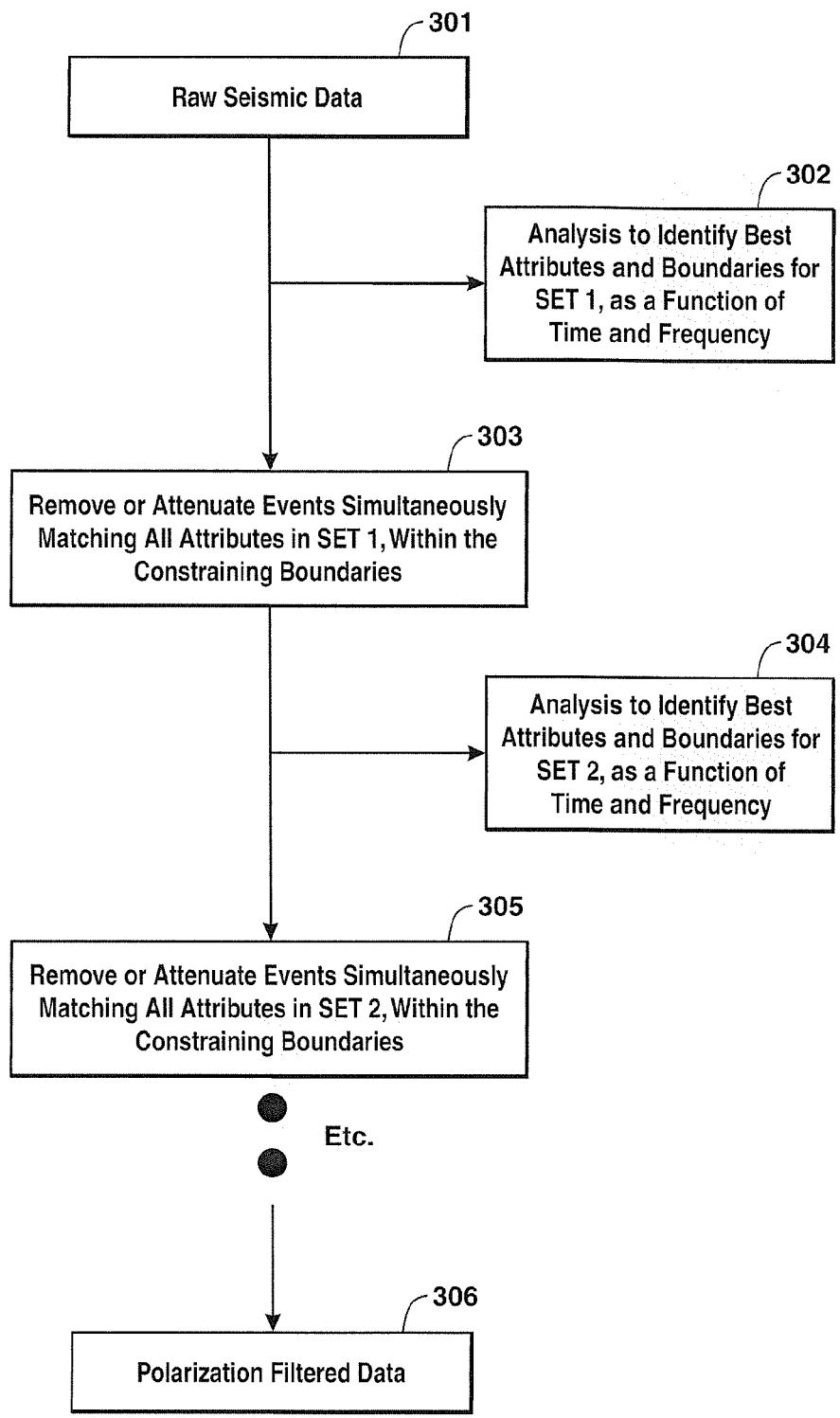
FIG. 3 is a process flow diagram that shows a method in accordance with an exemplary embodiment of the present invention.

FIG. 3 is a process flow diagram that shows a method in accordance with an exemplary embodiment of the present invention. The method is generally referred to by the reference number 300.

As fully set forth below, the exemplary method 300 relates to the improved processing and removal of seismic data corresponding to surface waves in cases where neither frequency filtering alone nor polarization filtering alone, nor a simple combination of the two, is adequate by itself to attenuate surface wave noise without damaging the signal. Moreover, exemplary embodiments of the invention set forth herein illustrate an improvement in surface wave mitigation that better protects signal relative to surface-wave filtering methods that only employ polarization attributes determined in the time-frequency domain. Exemplary embodiments of the present invention employ additional characteristics to facilitate optimal separation of surface wave noise from body wave reflections.

Exemplary embodiments of the present invention simultaneously apply polarization and time-frequency criteria to identify and remove surface waves, where polarization characteristics may include any of a variety of characteristics that relate the amplitude and phase behavior of surface-wave signals on the different components. More generally, exemplary embodiments of the present invention relate to the application of several criteria that characterize surface waves (polarization, direction of the polarization ellipse/ellipsoid, frequency, velocity, velocity dispersion, azimuth or the like) simultaneously in a process that distinguishes them from signal in any particular dataset. It has been discovered that such use of simultaneous attributes constrains the filters optimally to protect signal data while removing data corresponding to noise. As will be appreciated by those of ordinary skill in the art, the specific criteria that are the most descriptive, as well as what the thresholds should be used for the application of those criteria, will vary from dataset to dataset, and should therefore be derived from the data with physics-based guidance.

Those of ordinary skill in the art will appreciate that the exemplary method 300 can be applied to any surface wave noise mitigation technique that uses invertible, non-dyadic time-frequency transforms of the type mentioned above, including without limitation the Gabor transform. Supplementing known methods with a constrained approach in accordance with an exemplary embodiment of the present invention may yield better algorithms for surface-wave noise mitigation without altering the signal. An exemplary embodiment of the present invention can be used to yield more efficient algorithms for surface wave noise mitigation with higher order multi-component (two or more components) recording.

The exemplary method 300 begins with raw seismic data, as shown at block 301. The raw seismic data 301 comprises a multi-component dataset directly obtained by recording seismic waves at a particular geographic location with multi-component sensors.

At block 302, the multi-component seismic data 301 is analyzed to determine a) its polarization attributes, and b) constraining boundaries within which to filter. Based on the graphical analysis of these attributes, threshold values that best distinguish the surface wave noise from the signal in the particular seismic data 301 are selected. The earliest onset time of surface waves at each station is determined based on the maximum apparent velocity of the surface wave. From a time-frequency transform of the seismic data 301, the boundaries of the region mostly dominated by surface waves are determined. The amplitude in the time-frequency domain is analyzed to obtain threshold values that best distinguish surface waves from reflection events. The information gathered in this step, which helps to identify data corresponding to surface waves, constitutes the attributes and boundaries referred to as SET1 in FIG. 3.

At block 303, all wavelet coefficients that match the attributes in SET1 within the time-frequency and time-space boundaries dominated by surface waves are removed or attenuated. The output from block 303 is used as input to a new analysis at block 304, which is similar to block 302. Moreover, block 304 results in a second set of attributes and boundaries corresponding to surface wave noise characteristics. The second set of attributes and boundaries is referred to as SET2 in FIG. 3. The attributes and boundaries of SET2 are intended to remove residual surface wave noise from the output that remains after processing at block 303. The cascaded iteration of surface wave removal with different sets of attributes and boundaries is a consequence of the frequency dependence of the attributes and boundaries. Multiple iterations may improve the accuracy of filtered data because noise that may be masked by dominant noise in an earlier iteration may be identifiable after the dominant noise data is removed.

At block 305, all wavelet coefficients that match the new attributes in SET2 within the time-frequency and time-space boundaries dominated by surface waves are removed or attenuated. The result of processing at block 305 is a set of polarization filtered data, as shown at block 306. The polarization filtered data 306 may be used in the construction of a visual representation of an underground environment.

Those of ordinary skill in the art will appreciate that exemplary embodiments of the present invention differ in many respects from known filtering approaches, such as the known approach of using a polarization filter on band limited data as described above with reference to FIG. 1. In contrast, the exemplary embodiment of the invention described with reference to FIG. 3 employs polarization, frequency and other attributes (such as the local velocity and the temporal relationship within a record) all together in one unified noise reduction scheme, employing in its most general form an attribute hypercube where signal and noise separate almost completely.

Those of ordinary skill in the art will appreciate that an exemplary embodiment of the present invention may be implemented in the form of a computer system having elements of hardware and software. The hardware elements may comprise circuitry or the like. The software elements may comprise computer-readable instructions stored on a tangible machine-readable medium such as a computer memory. Various functional modules in accordance with an exemplary embodiment of the present invention may comprise both hardware and software elements, depending on individual system design considerations.

Figure 4:
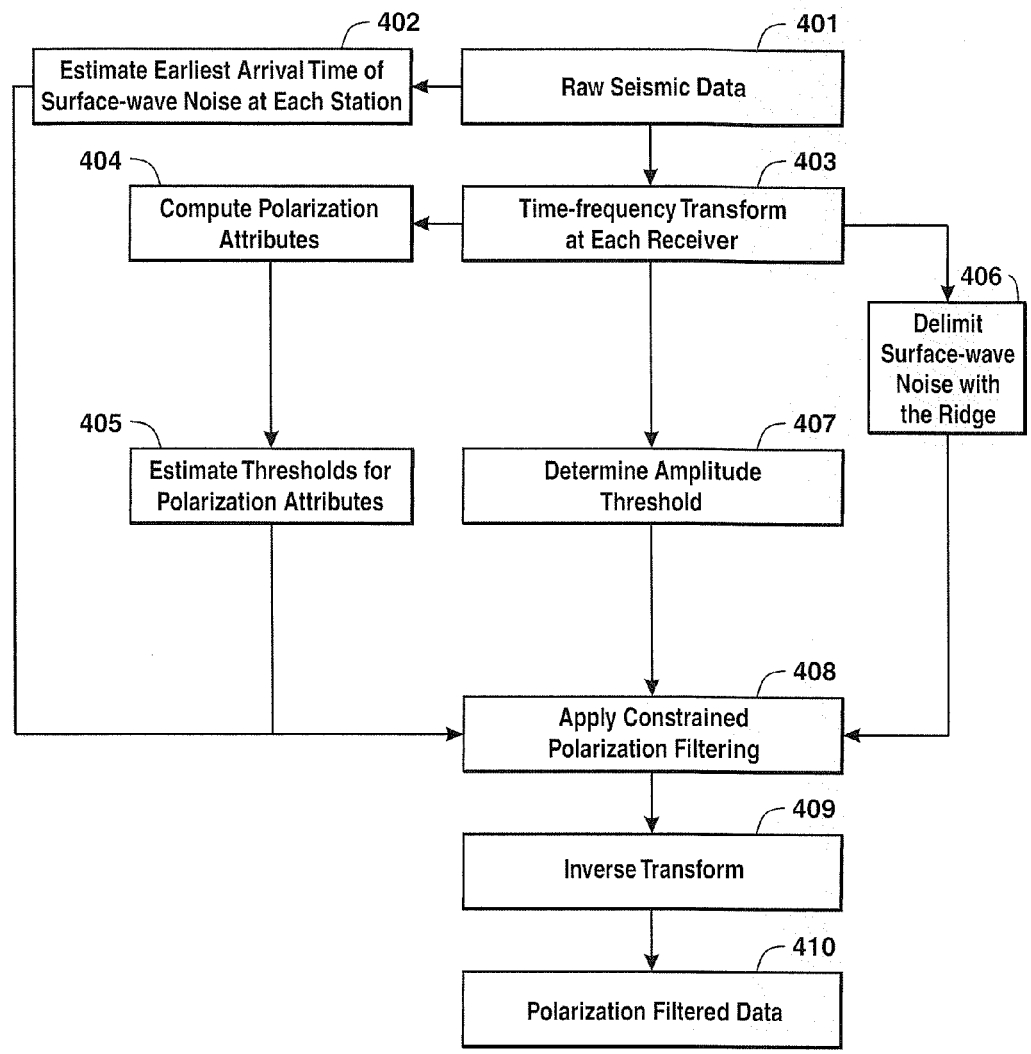
FIG. 4 is a process flow diagram that shows a method in accordance with an exemplary embodiment of the present invention.

FIG. 4 is a process flow diagram that shows a method in accordance with an exemplary embodiment of the present invention. The method is generally referred to by the reference number 400. The method 400 shows an exemplary embodiment of the present invention in which a subset of the attributes as defined by a "ridge" in the wavelet transform domain is employed to perform constrained polarization filtering. The ridge is one or more time-frequency boundary used to delineate and constrain the filtering of surface-waves. In one exemplary embodiment, the wavelet-transformed seismic data are used to define a ridge, as set forth in greater detail below, and the ridge, in combination with the attributes of inverse ellipticity and direction of polarization, and suitable thresholds of each, is used to filter the data. The method 400 is intended to mitigate surface-wave noises without damaging the body waves, which corresponds to signal.

The exemplary method 400 begins with raw seismic data, as shown at block 401. The raw seismic data 401 comprises a multi-component dataset directly obtained by recording seismic waves at a particular geographic location with multi-component sensors. Initially, a highest apparent velocity $v_{gr}$ of surface wave noise from the data is estimated. From this information, the earliest arrival time of surface wave noise $t_{gr}$ at each station using $v_{gr}$ and d, the distance from the source to the receiver for that station may be computed, as shown at block 402.

At block 403, a time-frequency transform of the raw seismic data C(t) at each receiver station is computed, for example, according to equation 1. At block 404, relevant polarization attributes that may be used to remove data corresponding to surface wave noise are computed, for example, according to equations 4 and 5 above. In particular, polarization attributes may be computed in time, then at each time-frequency point (b,f), using the equivalent expressions of these equations in the time-frequency domain. The attributes may then be analyzed to determine which ones have the best patterns to discriminate between signal and surface-wave noises. Typical Rayleigh waves, which are elliptically polarized along the vertical (depth direction z) axis, are characterized by absolute value of the rise angle close to $\pi/2$ and relatively large absolute values of the inverse ellipticity ratio.

From the analysis of the attributes plot, threshold values for the rise angle $\theta_{thr}$ and the inverse ellipticity ratio $\rho_{thr}$ that best differentiate the signal from surface wave noise at all stations are determined, as shown at block 405. These threshold values themselves could potentially vary with both time and frequency. At block 406, the time-frequency regions dominated by surface wave noise are delimited using one of the ridge detection methods to obtain the ridges $R^{\pm}_1(t)$ or $R^{\pm}_2(t,f)$ based on the time-frequency transform performed at block 403. This process is explained in greater detail below.

Maximum amplitude values are computed for the wavelet transform $A_{max}$ for each station. From the analysis of the modulus of the time-frequency domain, a threshold amplitude that is a fractional value of $A_{max}$ is determined at block 407. In an exemplary embodiment of the present invention, the threshold amplitude is determined such that, at any time-frequency point (t,f), if the amplitude is greater than that threshold value, then the corresponding wavelet coefficient is most likely associated with surface-wave noises.

Application of the constrained polarization parameters is performed at block 408 by adequately thresholding all wavelet coefficients $W_g C(t,f)$ that lie within the limits of the time-frequency boundaries defined by the ridges $R_1^{\pm}(t,t>t_{gr})$ or $R_2^{\pm}(t,f;t>t_{gr})$. Within the domain delimited by the ridges ($R_1^{\pm}(t,t>t_{gr})$ or $R_2^{\pm}(t,f;t>t_{gr})$), the thresholding of the wavelet coefficients is performed when either the rise angle $\theta(t>t_{gr},f)$ or the inverse ellipticity ratio $\rho(t>t_{gr},f)$ or the amplitude $A(t>t_{gr},f)$ do not meet the constraint on their respective threshold values (i.e. $\theta_{thr}, \rho_{thr}, A_{thr}$).

At block 409, an inverse time-frequency transform is performed on the output data from block 408, resulting in polarization filtered data. The polarization filtered data is shown at block 410 in FIG. 4.

The following discussion relates to the identification of a constrained region in the time-frequency domain that corresponds to a ridge having characteristics of a surface wave in accordance with an exemplary embodiment of the present invention. Moreover, the term "ridge" in this context refers to curves that delineate the time-frequency portion dominated by surface waves. Detection of a ridge serves to delimit the parts of the time-frequency (T-F) domain where the polarization filter is to be applied.

Figure 5:
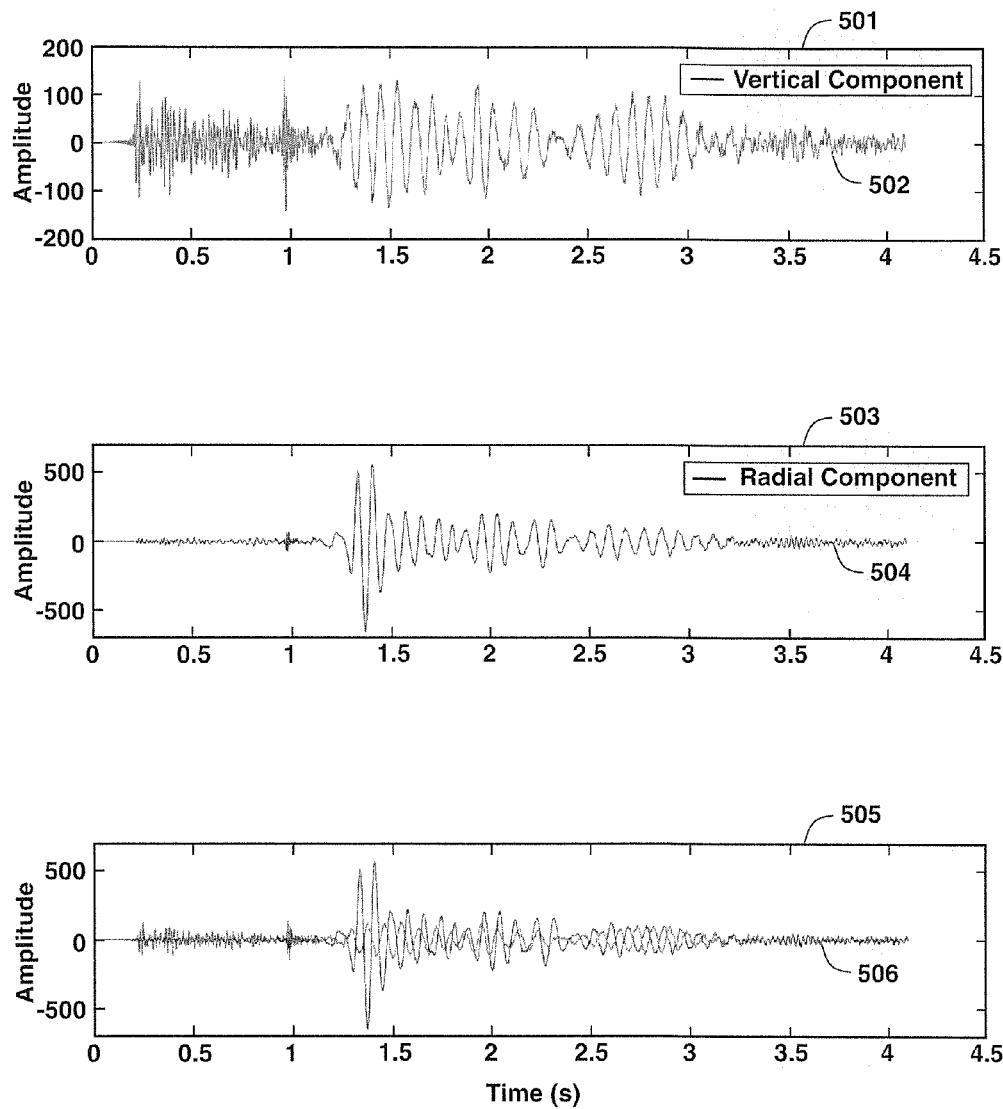
FIG. 5 is a graph that shows a relationship between a vertical component of seismic data and a radial component of the seismic data.

FIG. 5 is a graph that shows a relationship between a vertical component of seismic data and a radial component of the seismic data. The graph is generally referred to by the reference number 500. The graph 500 includes a top panel 501, a middle panel 503 and a lower panel 505. The top panel 501 shows a seismic trace 502 corresponding to a vertical component of seismic data. The middle panel 503 shows a seismic trace 504 corresponding to a radial component of seismic data. The lower panel 505 shows an overlay 506 of the seismic trace 502 with the seismic trace 504.

Two exemplary approaches for detecting a ridge in the time-frequency domain are described below with respect to FIG. 5. Both are performed in the T-F domain using the continuous wavelet transform domain. The first method relates to ridge detection based on instantaneous amplitude and the second method relates to ridge detection based on instantaneous frequency.

With respect to ridge detection based on instantaneous amplitude, one can identify the portion of the T-F domain that corresponds to surface wave arrivals from the modulus of the wavelet transform of the complex seismic trace C(t) formed by combining the radial and vertical component as in equation 1, as represented by the overlay 506 in FIG. 5. This is possible because surface waves usually have much higher amplitude than reflection arrivals and are mostly confined to the lower frequency range. An initial step in detecting the ridge in this case comprises scanning the frequency axis for each given time to find the maximum of the wavelet transform modulus. The resulting curves that define an initial ridge are functions $R^\pm(t)$ corresponding to the frequency f at which the modulus of the wavelet transform is maximum for each time t. This is discussed in greater detail below with reference to FIG. 6.

Figure 6:
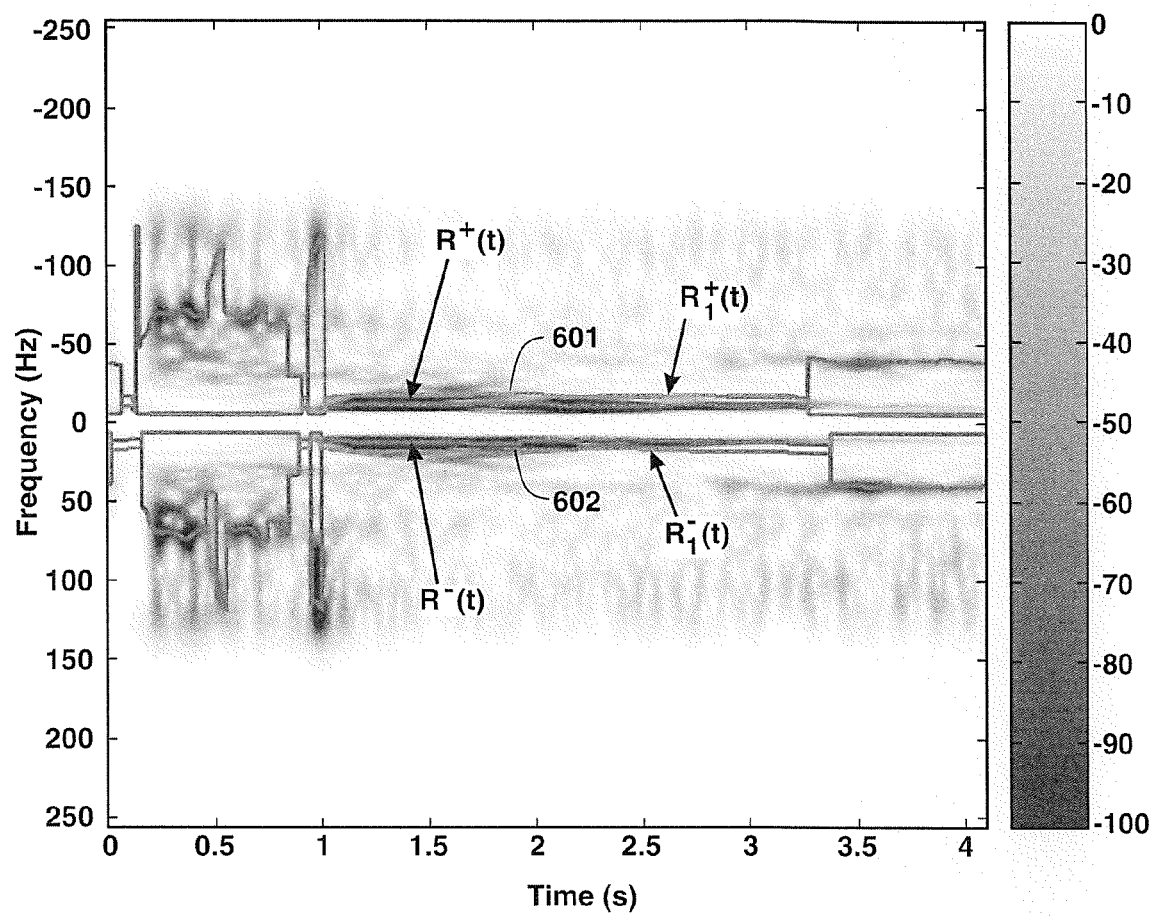
FIG. 6 is a graph that is useful in explaining the detection of a ridge based on a modulus of a time-frequency transform in accordance with an exemplary embodiment of the present invention.

FIG. 6 is a graph that is useful in explaining the detection of a ridge based on a modulus of a time-frequency transform in accordance with an exemplary embodiment of the present invention. The graph is generally referred to by the reference number 600. The graph 600 shows a curve 601, which corresponds to a function $R_1^+(t)$, and a curve 602, which corresponds to a function $R_1^-(t)$. At far-offsets, where surface waves are weak, the curves $R^\pm(t)$ may mistakenly lock onto reflection arrivals. At near offsets, where surface energy is predominant, the curves $R^\pm(t)$ give the frequency of the maximum amplitude of the surface wave arrival at each time.

Knowing the frequency range of the surface wave from the analysis of the wavelet transform modulus, we can adjust the curves $R^+(t)$ and $R^-(t)$ to serve as boundaries between the T-F domain dominated by signal on the one hand and surface wave noise on the other. These new boundary curves $R_1^+(t)$ and $R_1^-(t)$ may be defined as follows. First, define a threshold frequency $f_{thr}$ above which all arrivals are considered to be signal and apply the following approach to determine $R_1^\pm(t)$. At any time t and frequency f in the T-F domain, if $R^+(t)$ is greater than $f_{thr}$ then set $R_1^+(t)$ to a very small value $R_1^+(t) = \delta f_1$; otherwise set $R_1^+(t) = R^+(t) + \delta f_2$. Likewise, at any time t and frequency f in the T-F domain, if $R^-(t)$ is smaller than $-f_{thr}$ then set $R_1^-(t)$ to a larger value (small absolute value) $R_1^-(t) = -\delta f_1$; otherwise set $R_1^-(t) = R^-(t) - \delta f_2$. The frequency $\delta f_1$ is a small value and serves to set the ridges $R_1^\pm(t)$ to a small frequency value if $R^\pm(t)$ are mainly associated with reflection arrivals. The frequency $\delta f_2$ is a small value and serves to shift the ridges $R_1^\pm(t)$ by a small frequency value if $R^\pm(t)$ are mainly associated with surface wave noise arrivals. In the T-F regions dominated by surface waves, $\delta f_2$ is used to simply shift the position of the ridges $R_1^\pm(t)$ in order to create a small buffer band above the detected ridges.

Figure 7:
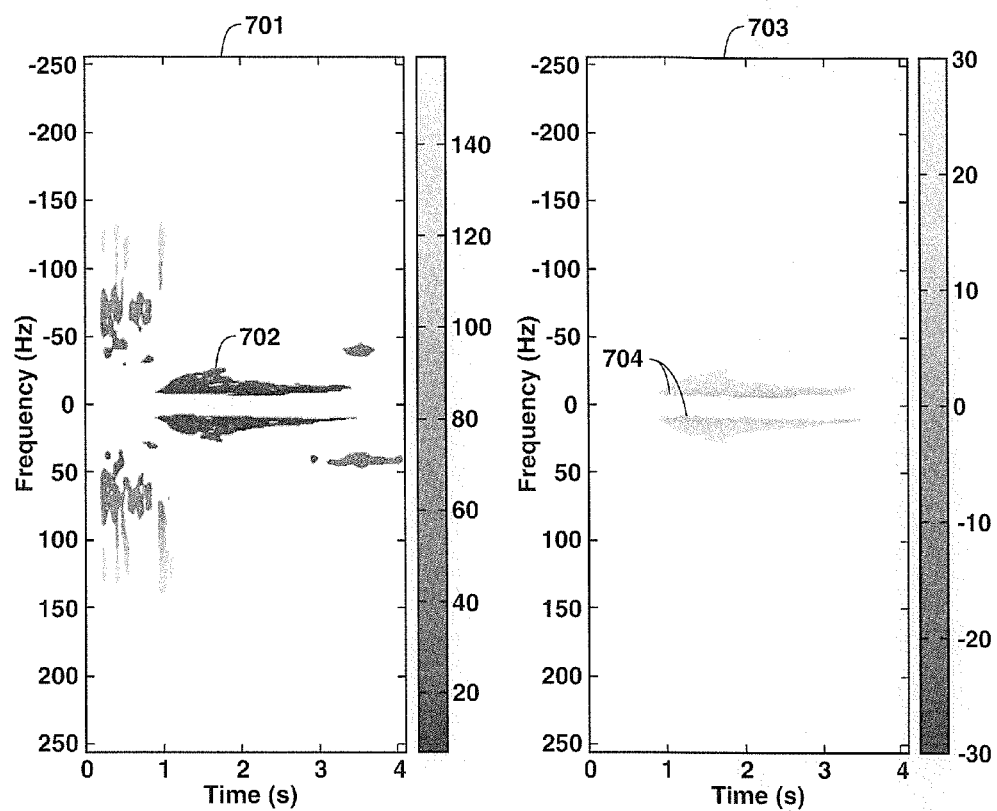
FIG. 7 is a graph showing an instantaneous frequency plot that is useful in explaining the detection of a ridge based on a instantaneous frequency in accordance with an exemplary embodiment of the present invention.

FIG. 7 is useful in explaining a second strategy for ridge detection, namely ridge detection based on instantaneous frequency. In particular, FIG. 7 is a graph showing an instantaneous frequency plot that is useful in explaining a filtering technique in accordance with an exemplary embodiment of the present invention. The graph is generally referred to by the reference number 700. The graph 700 includes a left panel 701 showing a group of time-frequency data 702 and a right panel 703 showing a group of time-frequency data 704.

As set forth above, the instantaneous frequency approach allows the detection of a boundary between surface waves and reflection arrivals. An important aspect of this approach is that the definition of the ridge does not require explicit knowledge of amplitude maxima, and hence might be found automatically without determining as many parameters as in the instantaneous amplitude method described above.

In the wavelet domain, it is possible to analytically compute the instantaneous frequency, $F^\pm(f,t)$ as follows.

$$F^\pm(f, t) = \frac{\partial W_g^\pm(t, f)}{\partial t} = -f \Im\left( \frac{W_{g'}^\pm(t, f)}{W_g^\pm(t, f)} \right), \quad (9)$$

where $W_{g'}^\pm(t,f)$ indicates the wavelet transform of C(t) with respect to the first derivative of the analyzing wavelet g(t)

$$\left( g'(t) = \frac{\partial g(t)}{\partial t} \right)$$

and $\Im$ indicates the imaginary part. A plot of F(t,f) is nearly constant along the time axis and monotonically increasing along the frequency axis. It shows little variation (nearly constant) along the time axis except where a sudden change in the frequency content of seismic traces occurs (due to interference). To determine the ridges, $R_2^\pm(t,f)$, simply compare the $F^\pm(t,f)$ to the threshold frequencies $\pm I_{thr}$ above which all arrivals are considered to be signal. The ridge is the frequency f at which $F^\pm(t,f) = \pm I_{thr}$, as shown in FIG. 7.

The instantaneous frequencies are only computed at points on the T-F domain where the amplitude is above a certain threshold. Points where the amplitude is below this threshold are set to a default high value outside the frequency range of the signal. The reason for adjusting the instantaneous frequency map in such a manner is to enable the differentiation between the signal and surface-wave noises. Surface-wave noises have relatively lower instantaneous frequencies than the signal in general.

In FIG. 7, the initial instantaneous frequency plot shown on the left panel 701 is re-plotted on the right panel 703 with threshold values $I_{thr1} = \pm 30$ Hz. We observe that only instantaneous frequencies with absolute values less than the threshold of 30 Hz are shown in the group of time-frequency data 704, which corresponds to the T-F domain occupied by the predominant surface-wave noise which is desirable to mitigate. Therefore, with the instantaneous frequency method, it is possible to delimit the contour of the T-F domain occupied by predominant surface-wave noise by specifying only one parameter, which is $I_{thr1}$. The contour lines where $F^\pm(t,f) = \pm I_{thr1}$ define the ridges $R_2^\pm(t,f)$.

Surface-wave attenuation can be achieved by using ridges determined by either one of the above methods. While using ridge $R_2^\pm(t,f)$ obtained by the instantaneous frequency method appears much more appealing because of its simplicity, it requires computing the wavelet transform two times (with respect to the wavelet and its derivative as in equation 9). With either of these definitions of a ridge, surface wave attenuation can be achieved by applying the polarization filtering constrained to be within the limit of the ridges. With either of the two approaches of detecting the ridge, an adaptive bandpass filtering can be performed (without polarization filtering) by appropriate thresholding (tapering or setting to zero) of the wavelet coefficients within the limit of the selected ridge, followed by an inverse wavelet transform to recover the filtered signal. This adaptive bandpass filtering is an improvement over simple bandpass filtering (where the filter threshold is constant for all time). This type of adaptive filtering would allow attenuation of surface waves on each component of the data separately, and in particular would be an alternative to current methods when only one component of the wavefield (e.g. Vz) is available.

Figure 8:
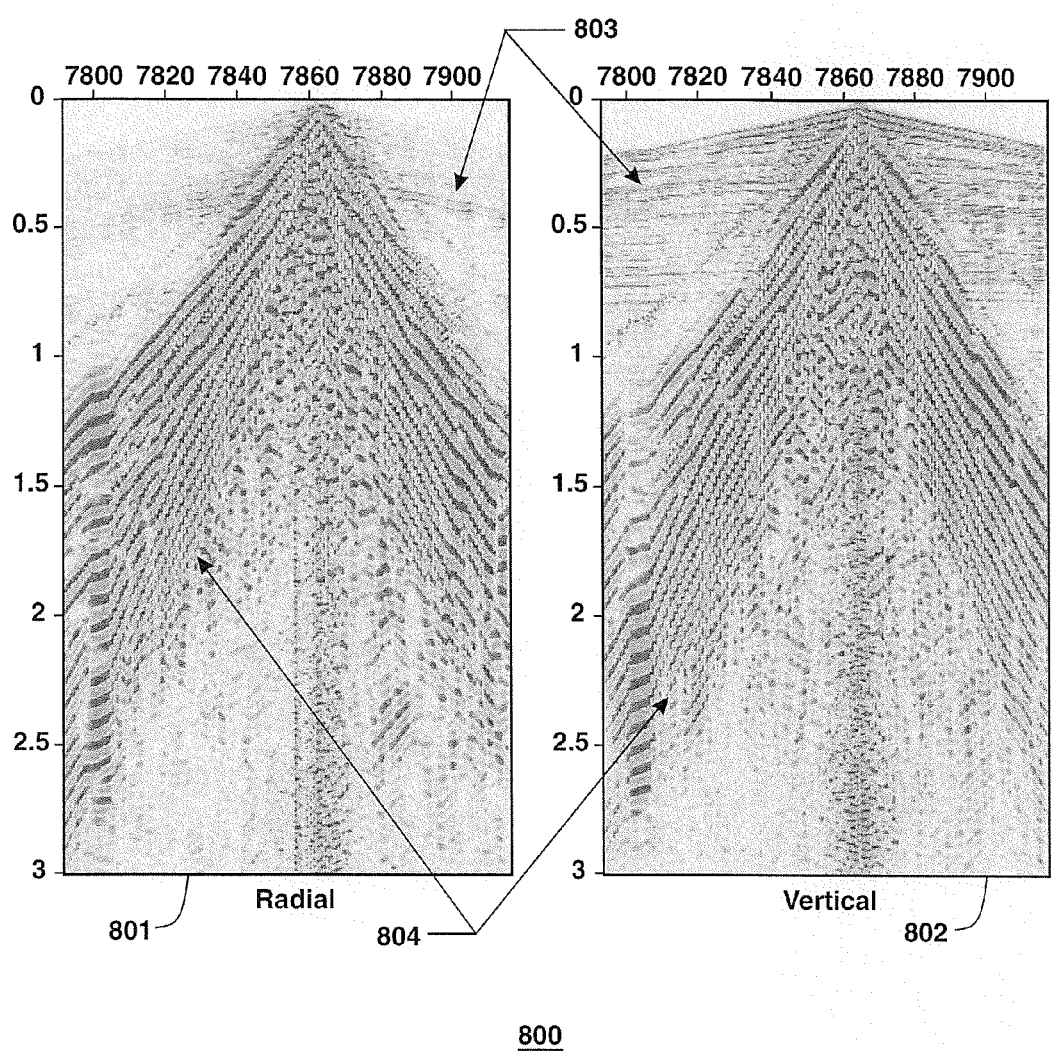
FIG. 8 is a seismic plot showing a raw shot record that is useful in explaining a filtering technique in accordance with an exemplary embodiment of the present invention.

FIG. 8 is a seismic plot showing a raw shot record that is useful in explaining a filtering technique in accordance with an exemplary embodiment of the present invention. The seismic plot is generally referred to by the reference number 800. The seismic record 800 shows radial (Vx) geophone components in a left panel 801 and vertical (Vz) geophone components in a right panel 802, containing signal (body waves) and ground roll noise (surface waves). The body waves appear as a plurality of relatively flat reflectors 803 and the surface waves appear as a strong, dipping noise signal 804. As set forth above, an objective of an exemplary embodiment of the present invention is to eliminate the effect of the dipping noise signal 804 using a constrained polarization filtering approach during the processing of seismic data.

Figure 9:
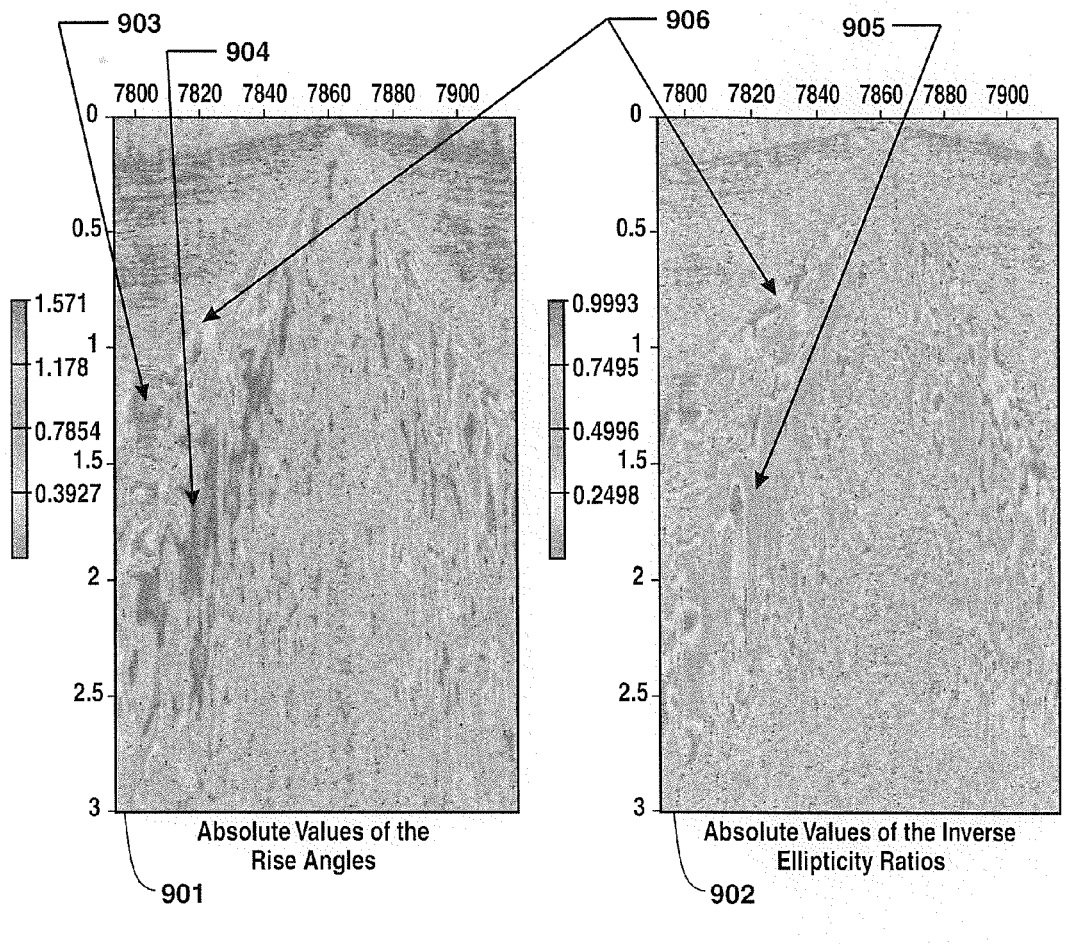
FIG. 9 is a graphical representation showing absolute values of polarization attributes derived from the seismic plot shown in FIG. 8.

FIG. 9 is a graphical representation showing absolute values of ellipticity attributes derived from the seismic plot shown in FIG. 8. The graph is generally referred to by the reference number 900. The graph 900 shows the absolute values of a rise angle in a left panel 901 and the absolute values of an inverse ellipticity ratio in a right panel 902. The absolute values of the rise angle and inverse ellipticity ratio are based on the raw data shown in FIG. 8. Those of ordinary skill in the art will appreciate that the graph 900 is shown in black and white for purposes of simplicity and compliance with local patent laws of many countries, but data may be more accurately depicted in a color representation.

The graph 900 indicates that surface wave noises contain two main types of arrivals: arrivals that are polarized both in the horizontal (a region 903 in the left panel 901) and vertical directions (a region 904 in the left panel 901). On the inverse ellipticity ratio plot shown in the right panel 902, a typical region of high values of ellipticity ratio (for example, a region 905 in the right panel 902) can be observed. The corresponding region 904 on the rise angle plot (right panel 901) shows high values of the rise angle (close to 1.571 or $\pi/2$, which is vertically polarized). These arrivals can be interpreted as the typical Rayleigh wave arrivals. A careful correlation between these plots and the raw data in FIG. 8 show that part of the surface wave noise does not have the Rayleigh wave characteristics but tends to be more linearly polarized with horizontal direction of arrival (event identified by the regions 906 in the left panel 901 and the right panel 902). These observations imply that the actual surface wave noise is not only comprised of the typical Rayleigh waves but may contain additional types of arrivals such as guided waves, scattered ground roll or the like. Also, it is noted that high inverse ellipticity ratio and rise angle are not exclusive to the surface wave. Because different types of interferences—with P-waves that are normally vertically and linearly polarized or with S-waves that are normally linearly polarized in the horizontal direction—may result in high values of inverse ellipticity ratio, it is difficult to distinguish them from the surface wave based on the polarization attributes alone.

Figure 10:
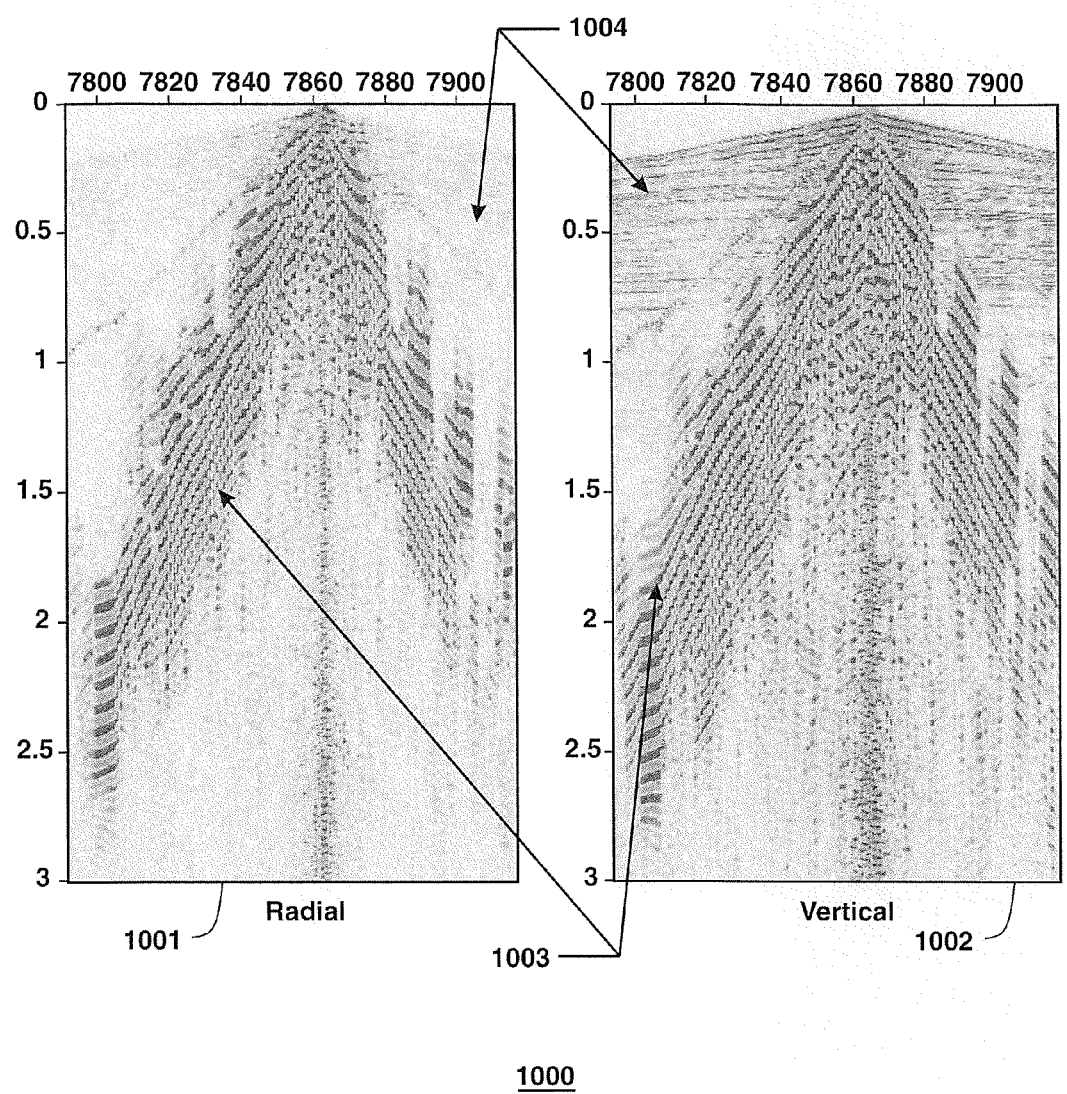
FIG. 10 is a seismic plot showing data based on the raw shot data shown in FIG. 8 that has undergone polarization filtering according to a known method without constraint on the space-time-frequency domain.

FIG. 10 is a seismic plot showing data based on the raw shot data shown in FIG. 8 that has undergone polarization filtering according to a known method without constraint on the space-time-frequency domain. The seismic plot is generally referred to by the reference number 1000. The seismic record 1000 shows filtered radial (Vx) geophone components in a left panel 1001 and filtered vertical (Vz) geophone components in a right panel 1002.

The filtered data shown in FIG. 10 was derived by allowing all wavelet coefficients corresponding to rise angles less than 50°($\approx$0.871 rad) to be attenuated. Subsequently, an inverse wavelet transform was performed on the data. This filtering step is intended to suppress horizontally traveling surface waves 1003. As can be seen in FIG. 10, however, this filtering removes some noise but leaves alone the lower frequency noise, and causes some damage to the signal (body waves 1004). The damage to the signal can be seen from the difference in amplitude of the arrivals from 0 to 1 s by comparing the raw data shown in FIG. 8 with the filtered data shown in FIG. 10.

Figure 11:
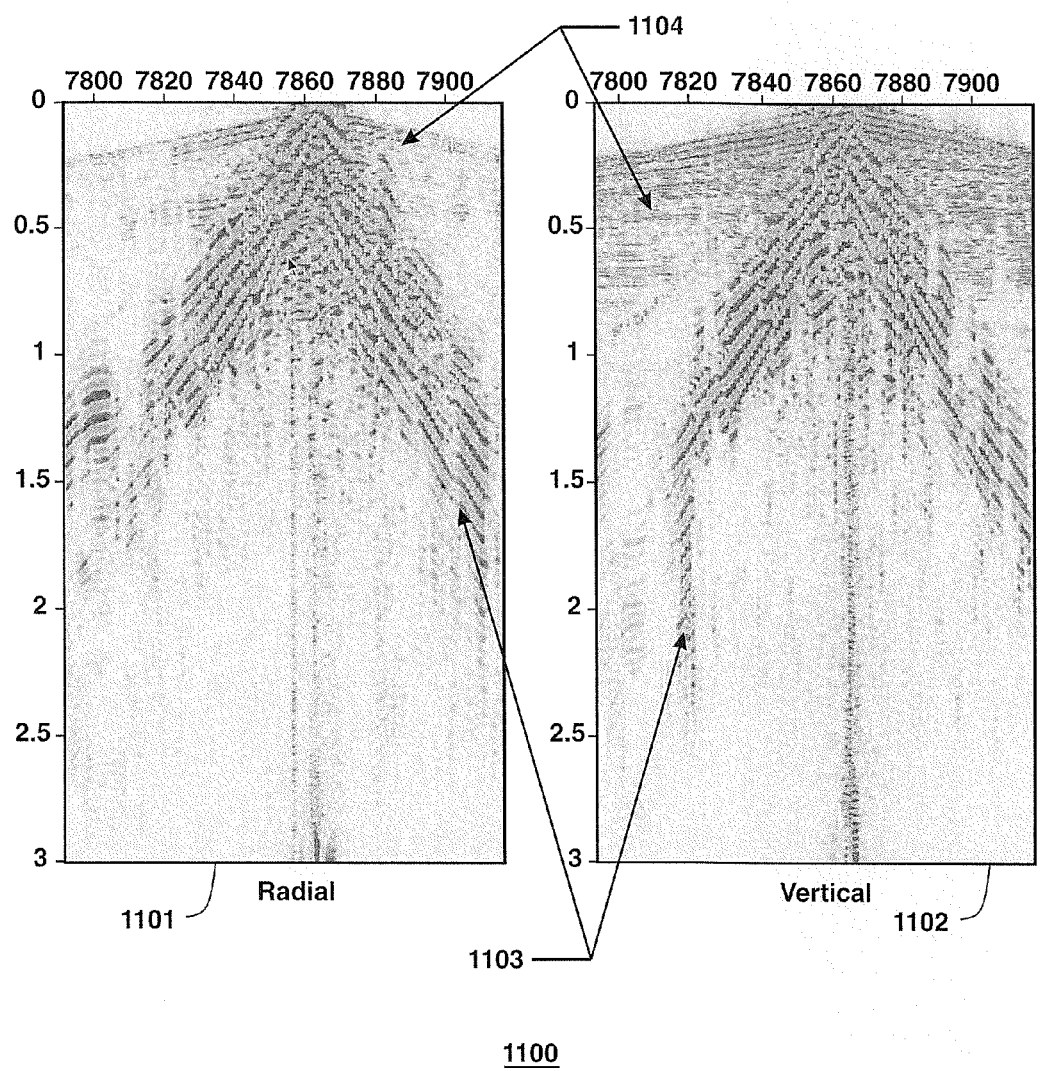
FIG. 11 is a seismic plot showing data based on the raw shot data shown in FIG. 8 that has undergone polarization filtering according to a known method without constraint on the space-time-frequency domain.

FIG. 11 is a seismic plot showing data based on the raw shot data shown in FIG. 8 that has undergone polarization filtering according to a known method without constraint on the space-time-frequency domain. The seismic plot is generally referred to by the reference number 1100. The seismic record 1100 shows filtered radial (Vx) geophone components in a left panel 1101 and filtered vertical (Vz) geophone components in a right panel 1102.

The filtered data shown in FIG. 11 was derived by allowing all wavelet coefficients with an ellipticity ratio greater than 0.15 to be attenuated. Subsequently, an inverse wavelet transform was performed on the data. This filtering step is intended to suppress highly polarized portions of the surface wave 1103 in the record and retain linear arrivals only (body waves 1104). As can be seen in FIG. 11, however, filtering based on this criterion ignores a significant amount of lower and higher frequency noise, and results in some damage to the signal. The effect on the signal can be seen from the difference in amplitude of the signal arrivals from 0 to 1s by comparing the raw data shown in FIG. 8 with the filtered data shown in FIG. 11.

Figure 12:
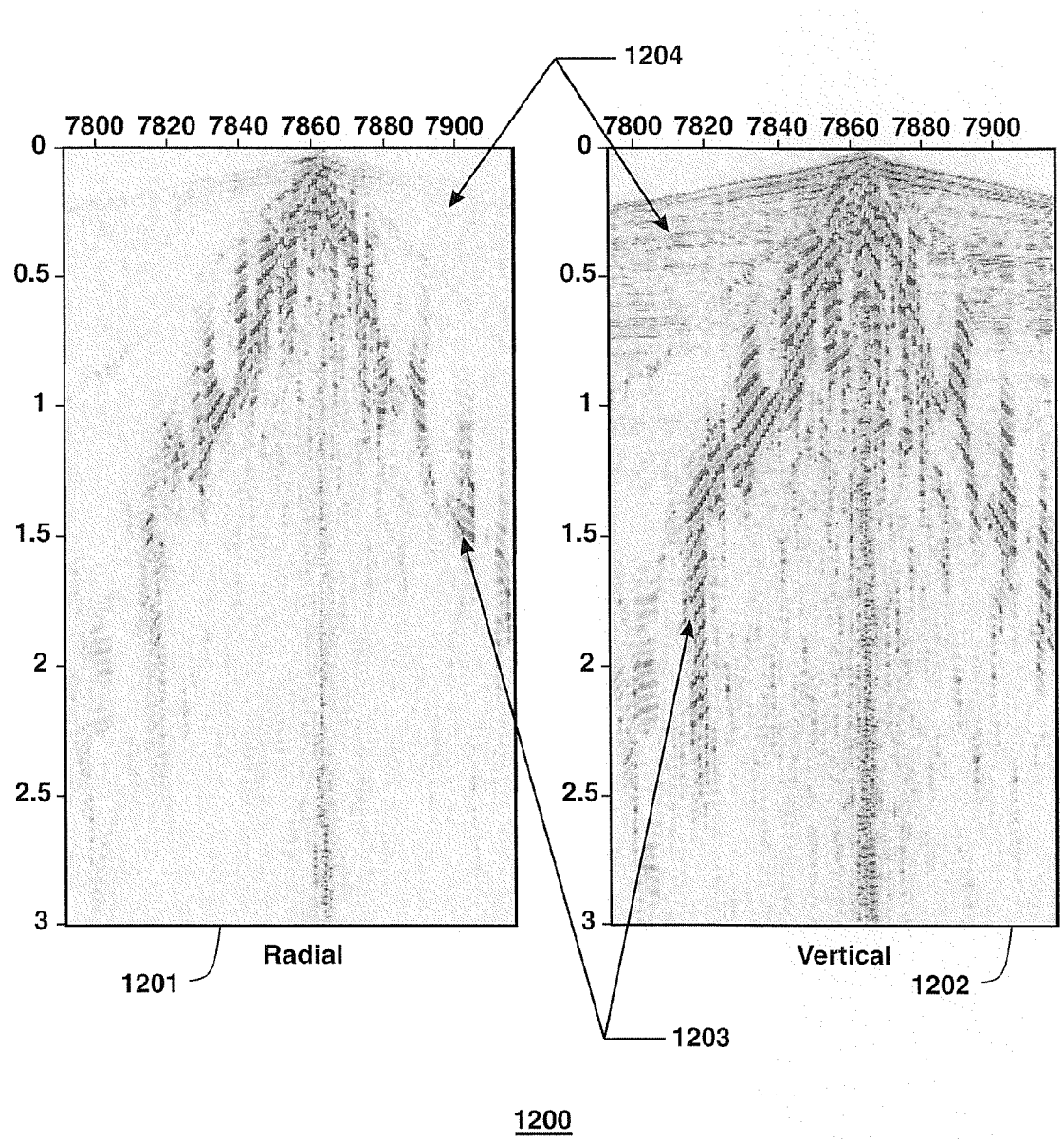
FIG. 12 is a seismic plot showing data based on the raw shot data shown in FIG. 8 that has undergone polarization filtering according to a known method without constraint on the space-time-frequency domain.

FIG. 12 is a seismic plot showing data based on the raw shot data shown in FIG. 8 that has undergone polarization filtering according to a known method without constraint on the space-time-frequency domain. The seismic plot is generally referred to by the reference number 1200. The seismic record 1200 shows filtered radial (Vx) geophone components in a left panel 1201 and filtered vertical (Vz) geophone components in a right panel 1202.

The filtered data shown in FIG. 12 was derived by allowing all wavelet coefficients with either an ellipticity ratio greater than 0.15 or a rise angle less than 50°($\approx$0.871 rad) to be attenuated. Subsequently, an inverse wavelet transform was performed on the data. This combined filtering step is intended to suppress both the highly polarized Rayleigh wave and the linearly polarized horizontally traveling surface wave, both represented by reference number 1203 in FIG. 12, while preserving the desired body waves 1204. As can be seen in FIG. 12, these filter settings provide better noise removal than the settings represented by the filtered data shown in FIG. 10 and FIG. 11, but with an increased damage to the signal (body waves 1204). The residual noise is more patchy and laterally discontinuous. The effect on the signal can be seen from the difference plot in FIG. 13.

Figure 13:
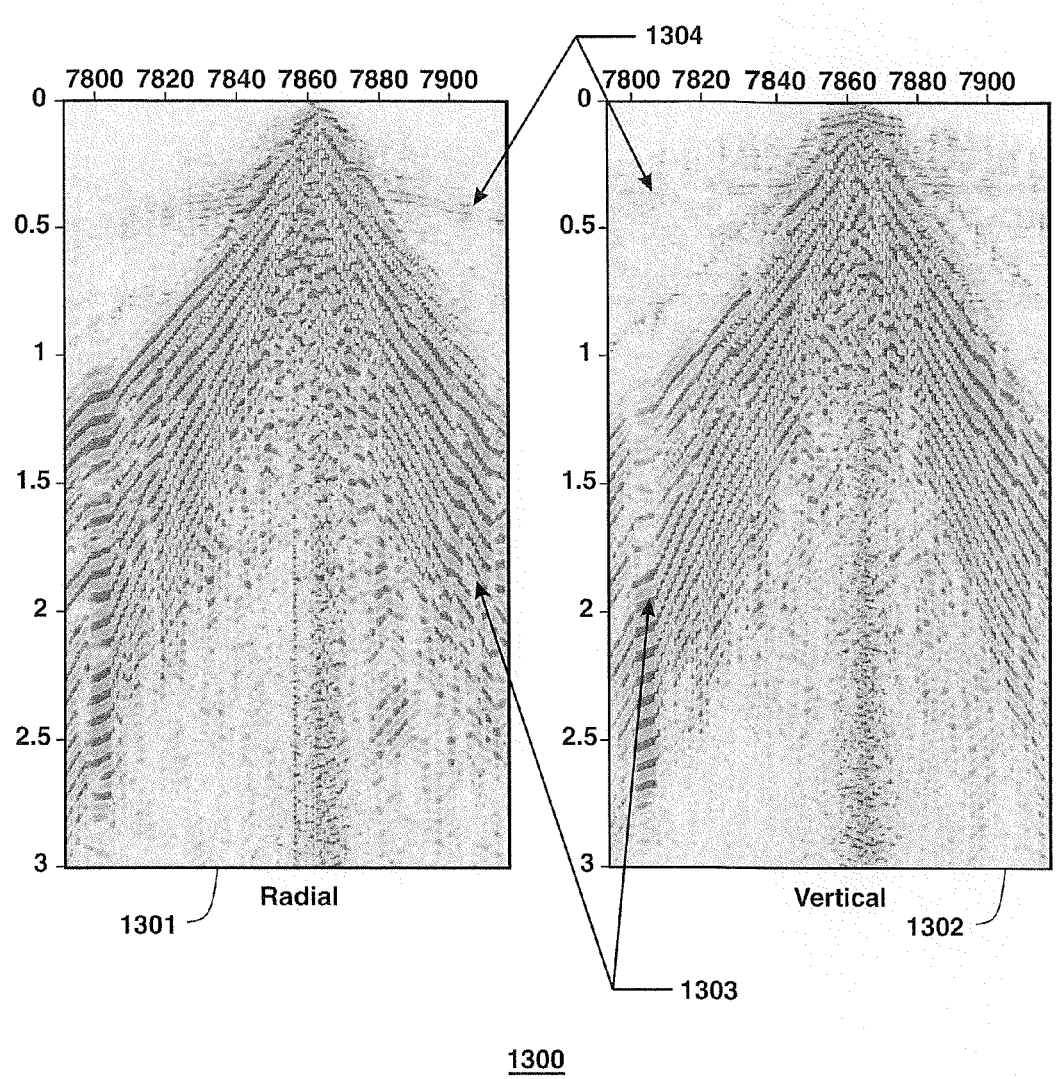
FIG. 13 is a seismic plot showing the difference between the raw shot data shown in FIG. 8 and the filtered data shown in FIG. 12.

FIG. 13 is a seismic plot showing the difference between the raw shot data shown in FIG. 8 and the filtered data shown in FIG. 12. The seismic plot is generally referred to by the reference number 1300. The seismic record 1300 shows the difference between the raw radial (Vx) geophone components shown in FIG. 8 and the filtered radial (Vx) geophone components shown in FIG. 12 in a left panel 1301. A right panel 1302 shows the difference between the raw vertical (Vz) geophone components shown in FIG. 8 and the filtered vertical (Vz) geophone components shown in FIG. 12. The difference between the surface wave in the filtered data (FIG. 12) and the surface wave in the raw data (FIG. 8) is referred to by reference number 1303. The difference between the body wave in the filtered data (FIG. 12) and the body wave in the raw data (FIG. 8) is referred by reference number 1304.

Those of ordinary skill in the art will appreciate that the examples of filtering seismic data shown and described with reference to FIGS. 10-13 show that combining the inverse ellipticity ratio and rise angle without any additional constraint improves the noise mitigation (though it is still far from satisfactory) but has significant detrimental impact on the signal.

Figure 14:
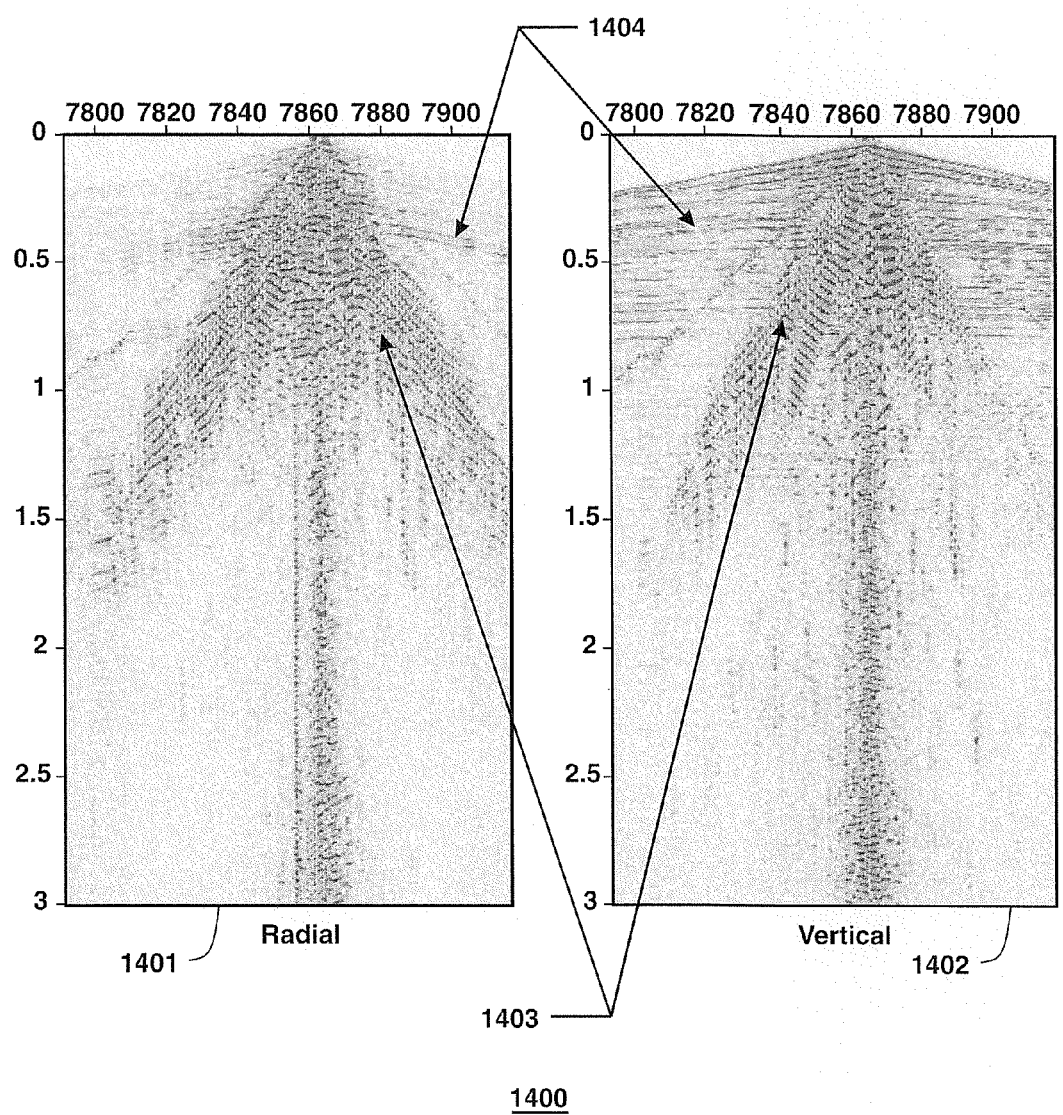
FIG. 14 is a seismic plot showing data based on the raw shot data shown in FIG. 8 that has undergone constrained polarization filtering in accordance with an exemplary embodiment of the present invention in which space, time-frequency and amplitude constraints are used to minimize damage to valid data.

FIG. 14 is a seismic plot showing data based on the raw shot data shown in FIG. 8 that has undergone constrained polarization filtering in accordance with an exemplary embodiment of the present invention in which space, time-frequency and amplitude constraints are used to minimize damage to valid data. The seismic plot is generally referred to by the reference number 1400. The seismic record 1400 shows filtered radial (Vx) geophone components in a left panel 1401 and filtered vertical (Vz) geophone components in a right panel 1402. Residual surface wave noise, which is desirably removed by a filtering technique in accordance with an exemplary embodiment of the present invention, is referred to in FIG. 14 by reference number 1403. Body wave signals, which are desirably preserved in a filtering technique in accordance with an exemplary embodiment of the present invention, are referred to by the reference number 1404.

In order to perform good polarization filtering while still protecting signal, an exemplary embodiment of the present invention relates to the application of a detection scheme that determines the predominant band of the surface-wave noises. This technique is explained above with reference to ridge detection. In addition, a constraint based on the instantaneous amplitude as described above with reference to FIG. 4 (block 407), is established. Once this band and amplitude constraint are determined, and they might vary with time and from trace to trace, application of polarization filtering with thresholds for the inverse ellipticity ratio, the rise angle, the amplitude and a time-space window only within the band defined by the ridge may be applied. Using these additional criteria to characterize noise, based not only on the degree of polarization but also on polarization direction and amplitude ratio within the noise frequency band, filtering performance relative to surface wave attenuation may be improved while protecting signal. The rationale behind using the amplitude ratio is that within the coherent noise frequency band, the amplitude of surface waves is generally significantly larger than that of body waves.

In the example shown in FIG. 14, ridge detection was based on the following parameters: $f_{thr}$=25 Hz, $\delta f_1$=0 Hz, $\delta f_2$=6 Hz. For the time-space constraint $v_{gr}$=300 ms was used to avoid touching any signal arriving earlier than a time determined by this velocity and the source-sensor distance. Within the time-frequency domain delimited by the ridge and within the portion of the record delimited by the time-space constraint, polarization filtering was applied to remove all wavelet coefficients with either an ellipticity ratio greater than 0.15 or with rise angles less than 50°(≈0.871 rad) or with an amplitude ratio greater than 0.1, followed by an inverse wavelet transform. Those of ordinary skill in the art will appreciate that the filtered seismic data shown in FIG. 14 represent significant improvement in the filtering of undesirable surface wave noise relative to the known filtering methods described above.

Figure 15:
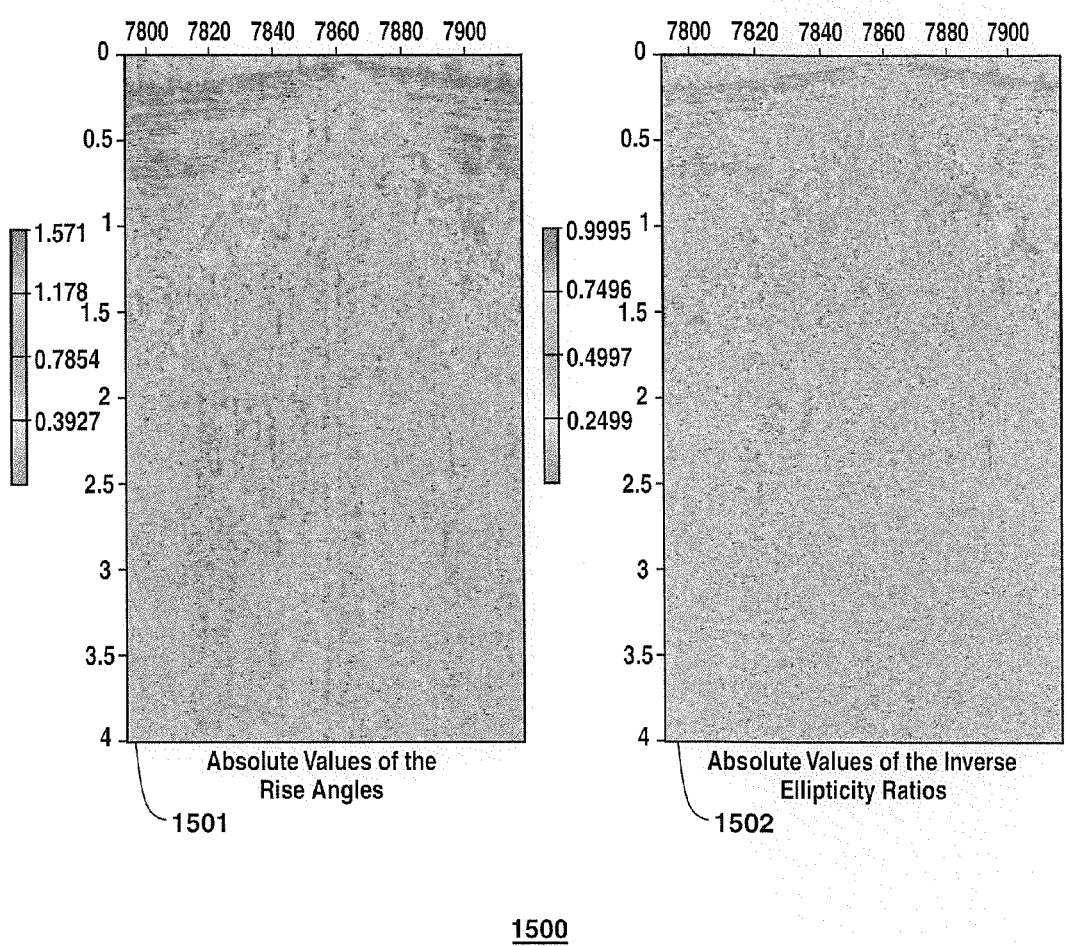
FIG. 15 is a graphical representation showing absolute values of rise angles and ellipticity attributes derived from the seismic plot shown in FIG. 14.

FIG. 15 is a graphical representation showing absolute values of rise angles and ellipticity attributes derived from the seismic plot shown in FIG. 14.

The graph is generally referred to by the reference number 1500. The graph 1500 shows the absolute values of rise angles of the seismic data shown in FIG. 8 in a left panel 1501 and the absolute values of the inverse ellipticity ratio of the seismic data shown in FIG. 8 in a right panel 1502. Those of ordinary skill in the art will appreciate that the graph 1500 is shown in black and white for purposes of simplicity and compliance with local patent laws of many countries, but data may be more accurately depicted in a color representation.

Despite the improved signal-to-noise ratio with complete signal protection obtained with the constrained filter setting, FIG. 14 still shows some coherent residual noises at relatively high frequency (as compared to the removed noise). These coherent residual noises can be clearly identified on the attributes plot in FIG. 15 with small rise angles and localized high ellipticity ratios. Moreover, those of ordinary skill in the art will appreciate that FIG. 15 may be useful in identifying attributes of the noise not removed in the first pass of constrained polarization filtering, the result of which is shown in FIG. 14. To attenuate these noises, a second pass of polarization filtering may be applied using filtered seismic data shown in FIG. 14 as input data. Due to the relatively higher frequency of the noise, for this second pass of polarization filtering the ridge detection was selected based on the following parameters: $f_{thr}$=30 Hz, $\delta f_1$=0 Hz, $\delta f_2$=6 Hz. For the time-space constraint, $v_{gr}$=300 ms was used. Within the time-frequency domain delimited by the ridge and the time-space region delimited by the velocity constraint, the polarization filtering may be applied to remove all wavelet coefficients with an ellipticity ratio greater than 0.15 or with rise angle greater than 34°(≈0.59 rad) or amplitude ratio greater than 0.1, followed by an inverse wavelet transform.

Figure 16:
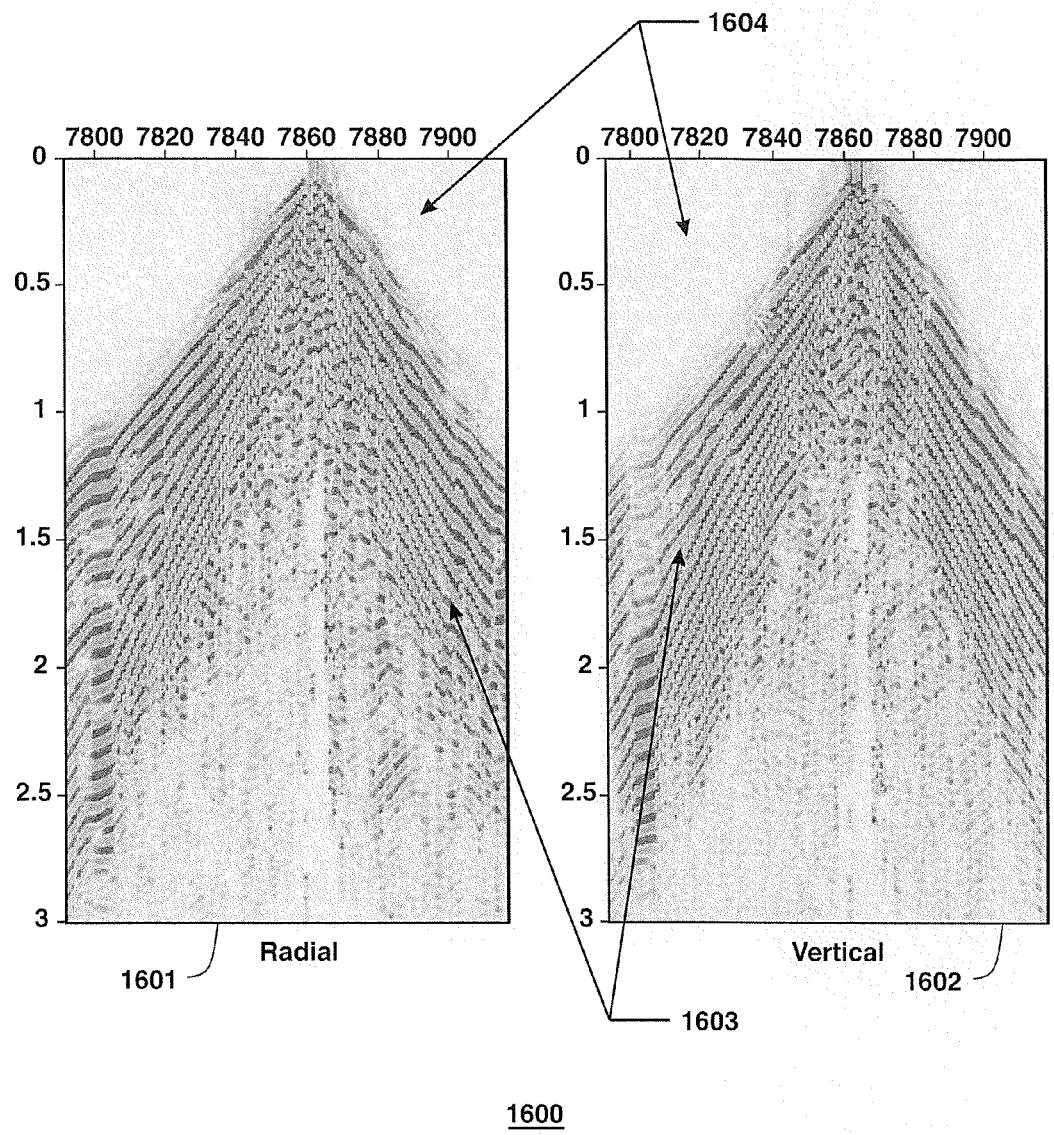
FIG. 16 is a seismic plot showing the difference between the raw shot data shown in FIG. 8 and the filtered data shown in FIG. 14.

FIG. 16 is a seismic plot showing the difference between the raw shot data shown in FIG. 8 and the filtered data shown in FIG. 14. The seismic plot is generally referred to by the reference number 1600. The seismic record 1600 shows the difference between the raw radial (Vx) geophone components shown in FIG. 8 and the filtered radial (Vx) geophone components shown in FIG. 14 in a left panel 1601. A right panel 1602 shows the difference between the raw vertical (Vz) geophone components shown in FIG. 8 and the filtered vertical (Vz) geophone components shown in FIG. 14. The difference between the surface wave in the filtered data (FIG. 14) and the surface wave in the raw data (FIG. 8) is referred to by reference number 1603. The difference between the body wave in the filtered data (FIG. 14) and the body wave in the raw data (FIG. 8) is referred by reference number 1604.

Figure 17:
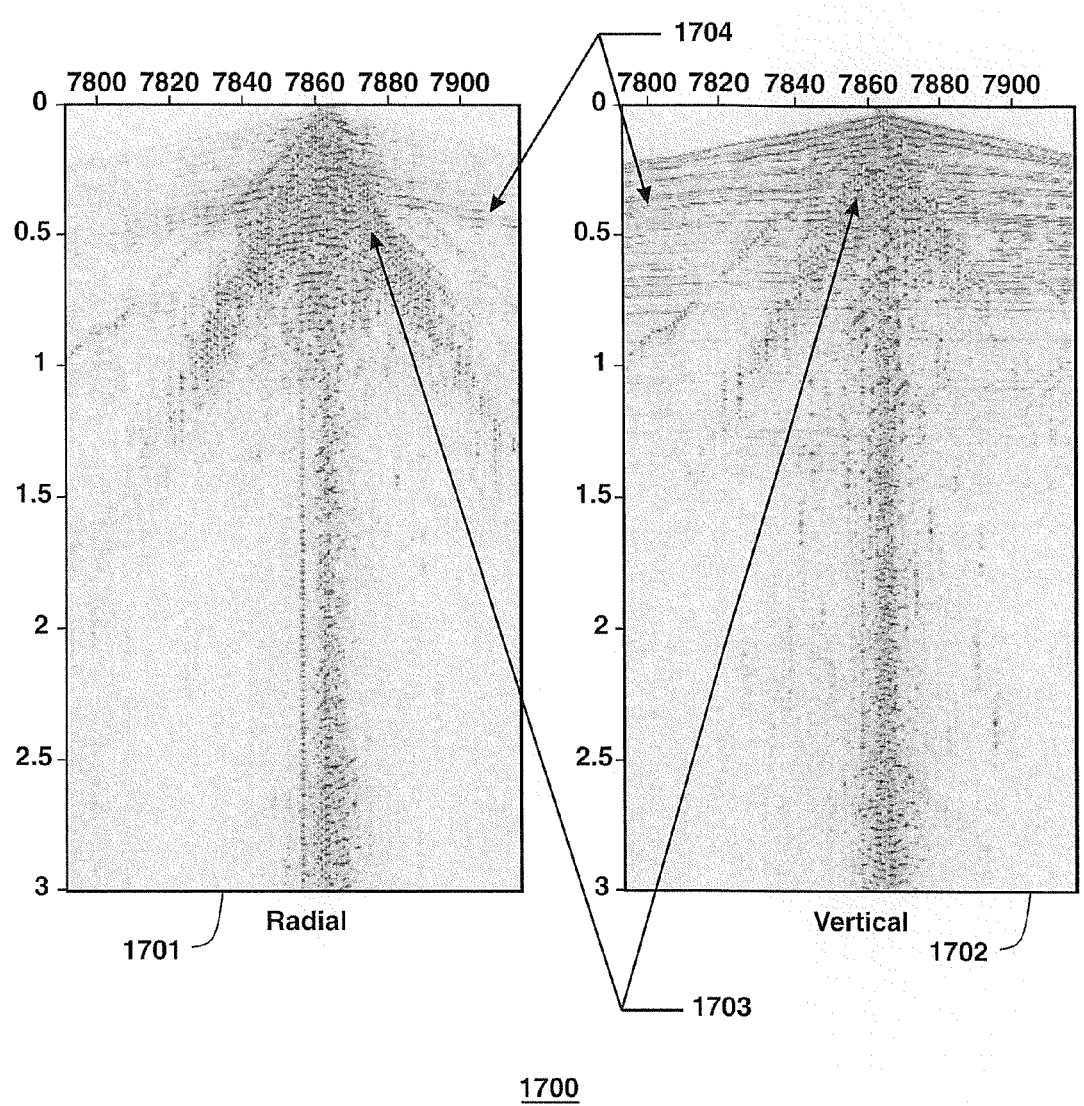
FIG. 17 is a seismic plot showing data shown in FIG. 14 that has further undergone a second pass of constrained polarization filtering in accordance with an exemplary embodiment of the present invention.

FIG. 17 is a seismic plot showing data shown in FIG. 14 that has further undergone a second pass of constrained polarization filtering in accordance with an exemplary embodiment of the present invention. The seismic plot is generally referred to by the reference number 1700. The seismic record 1700 shows filtered radial (Vx) geophone components in a left panel 1701 and filtered vertical (Vz) geophone components in a right panel 1702. Residual surface-wave noises, which are desirably removed by a filtering technique in accordance with an exemplary embodiment of the present invention, are referred to in FIG. 17 by reference number 1703. Body wave signals, which are desirably preserved in a filtering technique in accordance with an exemplary embodiment of the present invention, are referred to by the reference number 1704. In accordance with an exemplary embodiment of the present invention, the constraints for the second pass of polarization filtering were derived from the attribute data shown in FIG. 15. Those of ordinary skill in the art will appreciate that most of the residual coherent noises initially present in the data shown in FIG. 14 have been significantly attenuated in the data shown in FIG. 17.

Figure 18:
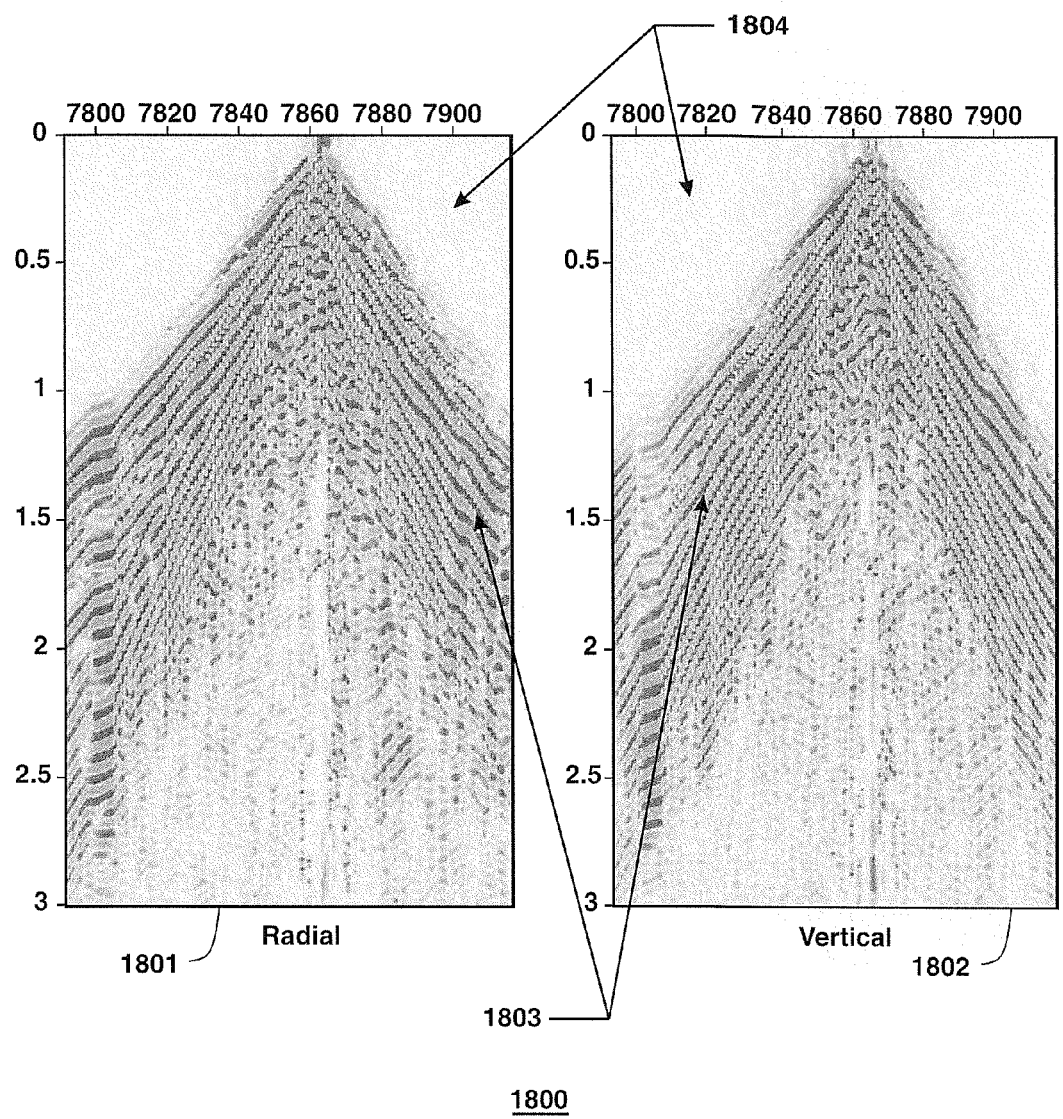
FIG. 18 is a seismic plot showing the difference between the raw shot data shown in FIG. 8 and the filtered data shown in FIG. 17.

FIG. 18 is a seismic plot showing the difference between the raw shot data shown in FIG. 8 and the filtered data shown in FIG. 17. The seismic plot is generally referred to by the reference number 1800. The seismic record 1800 shows the difference between the raw radial (Vx) geophone components shown in FIG. 8 and the filtered radial (Vx) geophone components shown in FIG. 17 in a left panel 1801. A right panel 1802 shows the difference between the raw vertical (Vz) geophone components shown in FIG. 8 and the filtered vertical (Vz) geophone components shown in FIG. 17. The difference between the surface wave in the filtered data (FIG. 17) and the surface wave in the raw data (FIG. 8) is referred to by reference number 1803. The difference between the body wave in the filtered data (FIG. 17) and the body wave in the raw data (FIG. 8) is referred by reference number 1804.

Table 2 below summarizes the ellipticity and ridge parameters used to produce the filtered data in the examples set forth above with reference to FIGS. 10, 11, 12, 14 and 17.

TABLE 2

Polarization and Ridge Parameters Used to Produce Filtered Data According to An Exemplary Embodiment of the Present Invention

| | FIG. 10 | FIG. 11 | FIG. 12 | FIG. 14 | FIG. 17 |
|---|---|---|---|---|---|
| $f_1$ | — | — | — | 25 Hz | 30 Hz |
| $\delta f_1$ | — | — | — | 0 Hz | 0 Hz |
| $\delta f_2$ | — | — | — | 6 Hz | 6 Hz |
| $f_{max}$ | 300 Hz | 300 Hz | 300 Hz | 300 Hz | 300 Hz |
| $\rho_{thr}$ | — | 0.15 | 0.15 | 0.15 | 0.15 |
| $\theta_{thr}$ | 50° | — | 50° | 50° | 34° |
| $A_{ratio\_thr}$ | — | — | — | 0.1 | 0.1 |

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for filtering multi-component seismic data, comprising:
    identifying a plurality of characteristics of the seismic data, the plurality of characteristics corresponding to a relative manifestation of surface wave noise on the different components;
    identifying boundary curves in the seismic data in a time-frequency domain, the time-frequency boundary curves forming a curved boundary delineating portions of the seismic data estimated to contain surface wave noise; and
    creating filtered seismic data, using a computer, by removing portions of the seismic data that correspond to the plurality of characteristics of surface waves and that are within the time-frequency boundary curves.

2. The method recited in claim 1, wherein at least one of the plurality of characteristics comprises a polarization attribute.

3. The method recited in claim 2, wherein the polarization attribute comprises a rise angle.

4. The method recited in claim 2, wherein the polarization attribute comprises an inverse ellipticity ratio.

5. The method recited in claim 2, wherein the polarization attribute comprises a direction of polarization.

6. The method recited in claim 1, wherein the curved boundary is identified in part by employing the maximum apparent velocity of surface-wave noises from the seismic data.

7. The method recited in claim 1, comprising performing a forward and/or inverse time-frequency transform on the seismic data.

8. The method recited in claim 1, comprising creating a visual representation of an underground environment based on the filtered seismic data.

9. The method recited in claim 1, comprising:
    identifying a second plurality of characteristics of the seismic data, the second plurality of characteristics corresponding to the relative manifestation of surface wave noises in the filtered seismic data;
    identifying a second time-frequency curved boundary in the filtered seismic data, the second time-frequency curved boundary delineating portions of the filtered seismic data estimated to contain surface wave noise; and
    creating second filtered seismic data by removing portions of the filtered seismic data that correspond to the second plurality of time-frequency characteristics and that are within the second time-frequency curved boundary.

10. The method of claim 1, wherein the curved boundary is detected in the time-frequency domain data either based on instantaneous amplitude or based on instantaneous frequency.

11. The method of claim 1, wherein the plurality of characteristics comprise a plurality of polarization characteristics in the seismic data in the time-frequency domain, wherein a threshold is estimated for each of the plurality of polarization characteristics, the threshold separating the multi-component seismic data into a first data portion that is estimated to contain surface-wave noises and a second data portion that is not estimated to contain surface-wave noises; and further comprising estimating an earliest arrival time of surface-wave noises for a portion of the seismic data recorded at a plurality of locations and using this in the creating filtered seismic data by removing portions of the seismic data that occur after the earliest arrival time of the surface wave noise.

12. A method for filtering multi-component seismic data, comprising:
    estimating an earliest arrival time of surface-wave noises for a portion of seismic data recorded at a plurality of locations using multi-component sensors;
    identifying a plurality of polarization characteristics of the multi-component seismic data in a time-frequency domain;
    estimating a threshold for each of the plurality of polarization characteristics of the multi-component seismic data, the threshold separating the multi-component seismic data into a first data portion that is estimated to contain surface-wave noises and a second data portion that is not estimated to contain surface-wave noises; and
    creating filtered seismic data, using a computer, by removing portions of the multi-component seismic data that correspond to the first data portion and that occur after the earliest arrival time of the surface-wave noise.

13. The method recited in claim 12 wherein the thresholds of the plurality of characteristics are functions of time, frequency and space.

14. The method recited in claim 12, wherein at least one of the plurality of polarization characteristics comprises a rise angle.

15. The method recited in claim 12, wherein at least one of the plurality of polarization characteristics comprises an inverse ellipticity ratio.

16. The method recited in claim 12, comprising performing a forward and/or inverse time-frequency transform on the filtered seismic data.

17. The method recited in claim 12, comprising creating a visual representation of an underground environment based on the filtered seismic data.

18. The method recited in claim 12, comprising:
    identifying a second plurality of polarization characteristics of the filtered seismic data in the time-frequency domain;
    estimating a threshold for each of the second plurality of polarization characteristics of the filtered seismic data, the threshold separating the filtered seismic data into a first filtered data portion that is estimated to contain surface wave noise and a second filtered data portion that is not estimated to contain surface wave noise; and creating second filtered seismic data by removing portions of the filtered seismic data that correspond to the first filtered data portion and that are within a range of the earliest arrival time.

19. A computer system that is adapted to perform filtering of multi-component seismic data, the computer system comprising:
- means for identifying a plurality of characteristics of the seismic data, the plurality of characteristics corresponding to a relative manifestation of surface wave noise on the different components;
- means for identifying boundary curves in the seismic data in a time-frequency domain, the time-frequency boundary curves delineating portions of the seismic data estimated to contain surface wave noise; and
- means for creating filtered seismic data by removing portions of the seismic data that correspond to the plurality of characteristics of surface waves and that are within the time-frequency boundary curves.

20. The computer system recited in claim 19, wherein at least one of the plurality of time-frequency characteristics comprises a polarization attribute.

21. The computer system recited in claim 20, wherein the polarization attribute comprises a rise angle.

22. The computer system recited in claim 20, wherein the polarization attribute comprises an inverse ellipticity ratio.

23. The computer system recited in claim 20, wherein the polarization attribute comprises a direction of polarization.

24. The computer system recited in claim 19, comprising means for performing a forward and/or inverse time-frequency transform on the filtered seismic data.

25. The computer system recited in claim 19, comprising means for creating a visual representation of an underground environment based on the filtered seismic data.

* * * * *